United States Patent
Kobayashi

(10) Patent No.: US 9,907,082 B2
(45) Date of Patent: Feb. 27, 2018

(54) RADIO BASE STATION, BASEBAND PROCESSING APPARATUS, SEMICONDUCTOR INTEGRATED CIRCUIT, RADIO COMMUNICATION SYSTEM AND CONTROL METHOD

(71) Applicant: FUJITSU LIMITED, Kawasaki-shi (JP)

(72) Inventor: Shinichiro Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 724 days.

(21) Appl. No.: 13/716,180

(22) Filed: Dec. 16, 2012

(65) Prior Publication Data

US 2013/0252622 A1  Sep. 26, 2013

(30) Foreign Application Priority Data

Mar. 23, 2012  (JP) .................. 2012-068321

(51) Int. Cl.
 *H04W 72/12* (2009.01)
 *H04L 5/00* (2006.01)
 *H04W 72/06* (2009.01)

(52) U.S. Cl.
 CPC ............ *H04W 72/12* (2013.01); *H04L 5/001* (2013.01); *H04L 5/006* (2013.01); *H04L 5/0037* (2013.01); *H04W 72/06* (2013.01); *H04L 5/0085* (2013.01)

(58) Field of Classification Search
 CPC ..... H04W 84/12; H04W 88/06; H04W 92/20; H04W 16/08; H04W 16/10; H04W 16/18; H04W 16/22; H04W 16/26; H04W 24/00; H04W 24/08; H04W 28/00; H04W 28/0215; H04W 28/0236; H04W 28/0268; H04W 28/042

USPC ....................................... 455/452.1
See application file for complete search history.

(56) References Cited

U.S. PATENT DOCUMENTS

| 2004/0110477 A1* | 6/2004 | Nishimura | ............ H04W 52/12 455/127.1 |
| 2008/0076407 A1* | 3/2008 | Shitara | .................. H04L 5/0007 455/424 |
| 2009/0303946 A1* | 12/2009 | Yokoyama | ............ H04L 5/0007 370/329 |

(Continued)

FOREIGN PATENT DOCUMENTS

| JP | 2010-263256 | 11/2010 |
| JP | 2011-176687 | 9/2011 |

OTHER PUBLICATIONS

3GPP TS 36.213 V10.4.0 (Dec. 2011), 3rd Generation Partnership Project; Technical Specification Group Radio Access Network; Evolved Universal Terrestrial Radio Access (E-UTRA); Physical layer procedures (Release 10).

(Continued)

*Primary Examiner* — Joseph Dean, Jr.
(74) *Attorney, Agent, or Firm* — Fujitsu Patent Center

(57) ABSTRACT

A radio base station providing a service to a radio terminal by using plural component carriers includes a scheduler preferentially allocating, to the radio terminal, one of the component carriers that has a transmission power dynamic range whose lower limit value is lower than lower limit values of transmission power dynamic ranges of a rest of the component carriers; and a transmitter transmitting a radio signal to the radio terminal by using the allocated component carrier.

11 Claims, 36 Drawing Sheets

(56) References Cited

U.S. PATENT DOCUMENTS

| | | | |
|---|---|---|---|
| 2010/0091724 A1* | 4/2010 | Ishii ................. | H04W 52/32 |
| | | | 370/329 |
| 2011/0280169 A1* | 11/2011 | Seo et al. ................. | 370/311 |
| 2012/0083308 A1* | 4/2012 | Wang ................. | H04W 52/367 |
| | | | 455/522 |
| 2012/0106477 A1* | 5/2012 | Kwon ................. | H04W 52/365 |
| | | | 370/329 |

OTHER PUBLICATIONS

3GPP TS 36.300 V11.0.0 (Dec. 2011) 3rd Generation Partnership Project; Technical Specification Group Radio Access Network; Evolved Universal Terrestrial Radio Access(E-UTRA) and Evolved Universal Terrestrial Radio Access Network (E-UTRAN); Overall description; Stage 2 (Release 11).

* cited by examiner

FIG.1
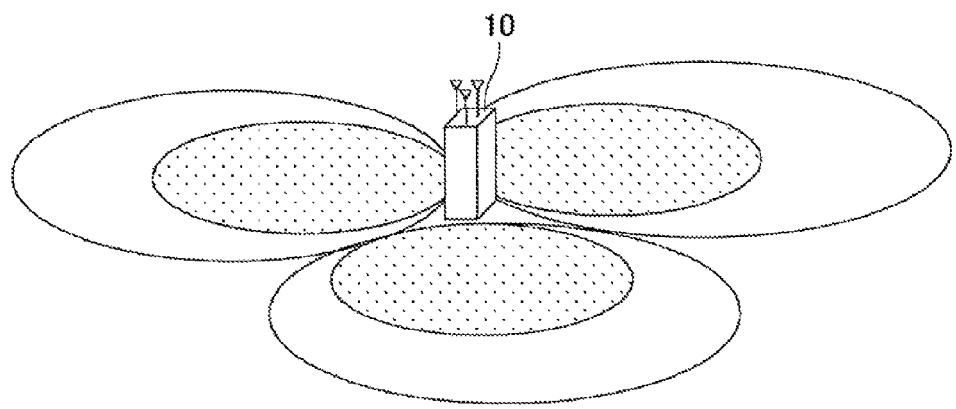
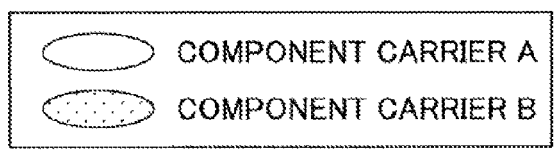

FIG.3
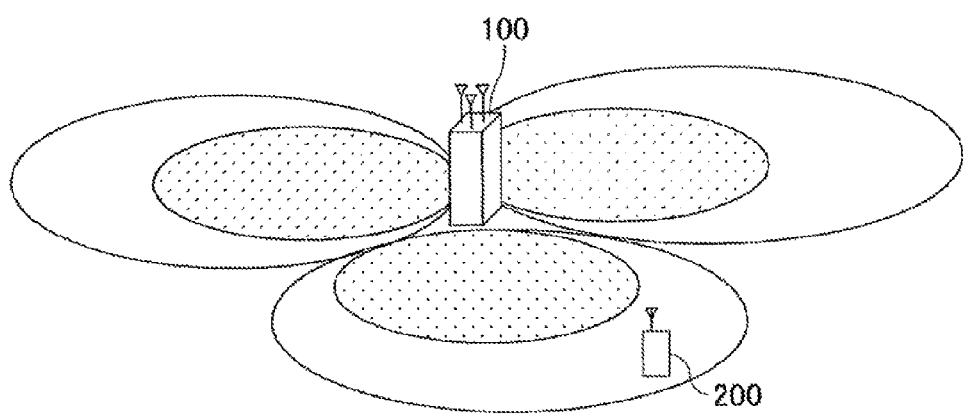
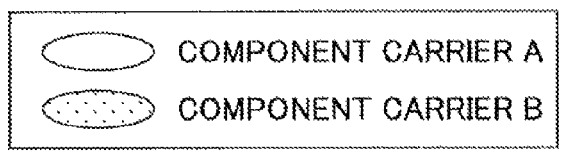

FIG.6
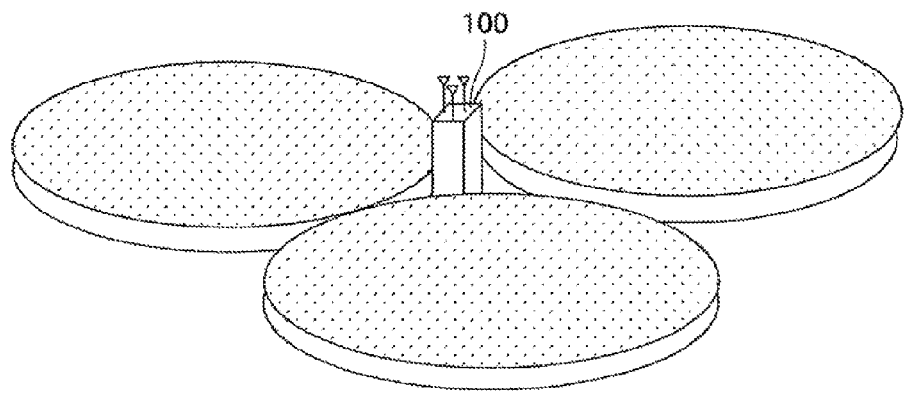
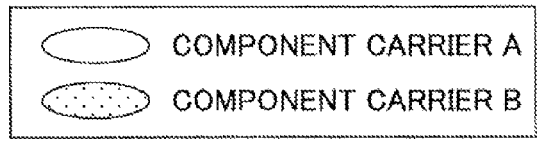
FIG.7
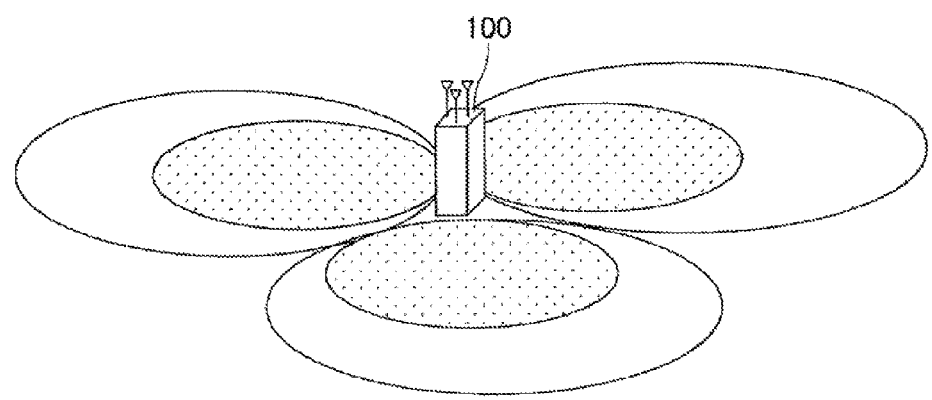
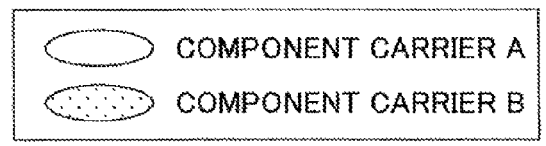

FIG.8

| ITEM NUMBER | INPUT | | | | | | OUTPUT |
| --- | --- | --- | --- | --- | --- | --- | --- |
| | TRAFFIC INFORMATION | POWER RESOURCE INFORMATION | POWER SUPPLY CONDITION INFORMATION | CONTROL INFORMATION | SAVE ENERGY REQUEST INFORMATION | MODE SWITCHING INFORMATION | EXTERNAL POWER SUPPLY INFORMATION | SAVE MODE SWITCHING INFORMATION |
| 1 | SMALL | LOW | LOW | REQUESTED | REQUESTED | REQUESTED | NOT SUPPLIED | ON |
| 2 | SMALL | LOW | LOW | REQUESTED | REQUESTED | NOT REQUESTED | NOT SUPPLIED | ON |
| 3 | SMALL | LOW | LOW | REQUESTED | REQUESTED | REQUESTED | NOT SUPPLIED | ON |
| ... | ... | ... | ... | ... | ... | ... | ... | ... |
| 128 | LARGE | HIGH | HIGH | NOT REQUESTED | NOT REQUESTED | NOT REQUESTED | SUPPLIED | OFF |

FIG.10

| EXTERNAL POWER SUPPLY INFORMATION | OUTPUT FROM WEIGHT SELECTOR |
|---|---|
| SUPPLIED | W3 |
| NOT SUPPLIED | W4 |

FIG.11

| OUTPUT FROM ADDER 716 ≧ THRESHOLD VALUE | SAVE MODE SWITCHING INFORMATION |
|---|---|
| truth | SAVE MODE VALID |
| false | SAVE MODE INVALID |

FIG.12

| POWER SUPPLY CONDITION INFORMATION | MAXIMUM TRANSMISSION POWER SETTING INFORMATION |
|---|---|
| 1(Empty) | STOP COMPONENT CARRIER |
| 2(Middle) | REDUCE MAXIMUM TRANSMISSION POWER VALUE BY x dB |
| 3(Full) | USE MAXIMUM TRANSMISSION POWER VALUE MAX |

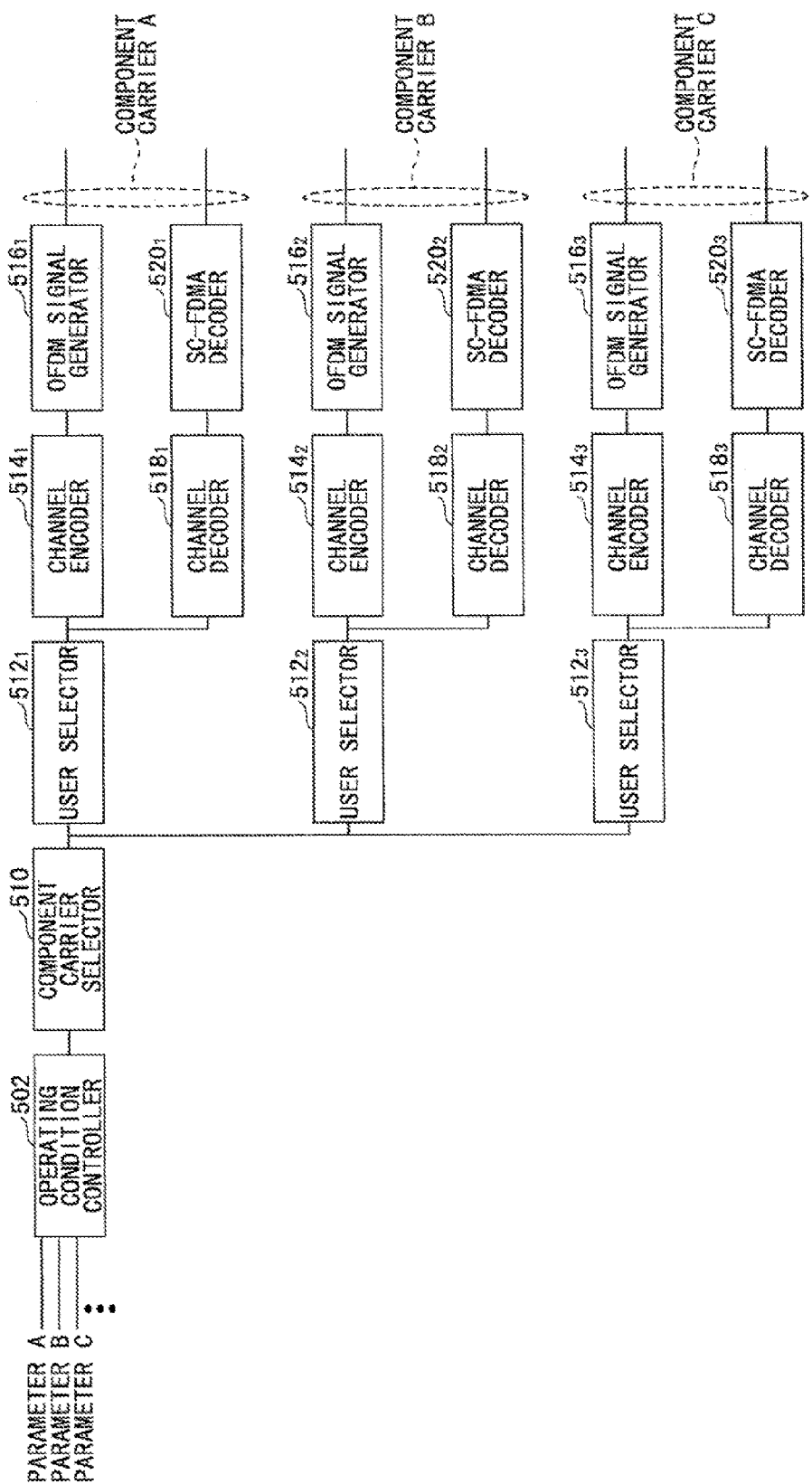

FIG.14

| MAXIMUM TRANSMISSION POWER | ALLOCATION PRIORITY LEVEL |
|---|---|
| Low | PRIORITY LEVEL 1 (HIGH) |
| Middle | PRIORITY LEVEL 2 |
| High | PRIORITY LEVEL 3 (LOW) |

FIG.19

| TIGHTNESS OF POWER SUPPLY CONDITION | ALLOCATION ALGORITHM |
|---|---|
| LOW | SECOND OPERATION FLOW |
| HIGH | FIRST OR THIRD OPERATION FLOW |

FIG.20

| OPERATION FLOW SWITCHING CONDITION | ALLOCATION MODE |
|---|---|
| CALCULATION RESULT < X | NORMAL MODE |
| X ≦ CALCULATION RESULT < Y | SECOND OPERATION FLOW |
| Y ≦ CALCULATION RESULT | FIRST OR THIRD OPERATION FLOW |

FIG.23

| ITEM NUMBER | STATE OF COMPONENT CARRIER A | STATE OF COMPONENT CARRIER B | INFORMATION INDICATED IN PARAMETER D | STATE OF COMPONENT CARRIER C | ENERGY CONSUMPTION |
|---|---|---|---|---|---|
| 1 | ON | ON | INVALID | ON | 8 |
| 2 | ON | OFF | VALID | OFF | 5 |
| 3 | OFF | ON | VALID | OFF | 3 |
| 4 | OFF | OFF | INVALID | ON | 2 |
| 5 | ON | ON | VALID | OFF | 7 |
| 6 | OFF | ON | INVALID | ON | 4 |
| 7 | ON | OFF | INVALID | ON | 6 |
| 8 | OFF | OFF | VALID | OFF | 1 |

FIG.24

| ITEM NUMBER | CONDITION DETERMINATION USING THRESHOLD VALUES BY THRESHOLD COMPARATOR | CELL OPERATING STATES | | |
|---|---|---|---|---|
| | | STATE OF COMPONENT CARRIER A | STATE OF COMPONENT CARRIER B | STATE OF COMPONENT CARRIER C |
| 1 | CALCULATION RESULT ≧ A | OFF | OFF | OFF |
| 2 | B ≦ CALCULATION RESULT < A | OFF | OFF | ON |
| 3 | C ≦ CALCULATION RESULT < B | OFF | ON | OFF |
| 4 | D ≦ CALCULATION RESULT < C | OFF | ON | ON |
| 5 | E ≦ CALCULATION RESULT < D | ON | OFF | OFF |
| 6 | F ≦ CALCULATION RESULT < E | ON | OFF | ON |
| 7 | G ≦ CALCULATION RESULT < F | ON | ON | OFF |
| 8 | CALCULATION RESULT < G | ON | ON | ON |

FIG.29

| ITEM NUMBER | SUM OF TRAFFIC OF eNB#1 AND eNB#2(PARAMETER E) | CELL OPERATING STATES |
|---|---|---|
| 1 | POSSIBLE TO ACCOMMODATE BY COMPONENT CARRIER A | ITEM NUMBER "2" IN FIG. 23 |
| 2 | NOT POSSIBLE TO ACCOMMODATE BY COMPONENT CARRIER A | ITEM NUMBER "6" IN FIG. 23 |

FIG.37

| ITEM NUMBER | CONDITION DETERMINATION USING THRESHOLD VALUES BY THRESHOLD COMPARATOR | CELL OPERATING STATES | | |
| --- | --- | --- | --- | --- |
| | | STATE OF COMPONENT CARRIER A | STATE OF COMPONENT CARRIER B | STATE OF COMPONENT CARRIER C |
| 1 | A < CALCULATION RESULT | OFF | OFF | OFF |
| 2 | B < CALCULATION RESULT | OFF | OFF | ON |
| 3 | C < CALCULATION RESULT | OFF | ON | OFF |
| 4 | D < CALCULATION RESULT | OFF | ON | ON |
| 5 | E < CALCULATION RESULT | ON | OFF | OFF |
| 6 | F < CALCULATION RESULT | ON | OFF | ON |
| 7 | G < CALCULATION RESULT | ON | ON | OFF |
| 8 | CALCULATION RESULT < H | ON | ON | ON |

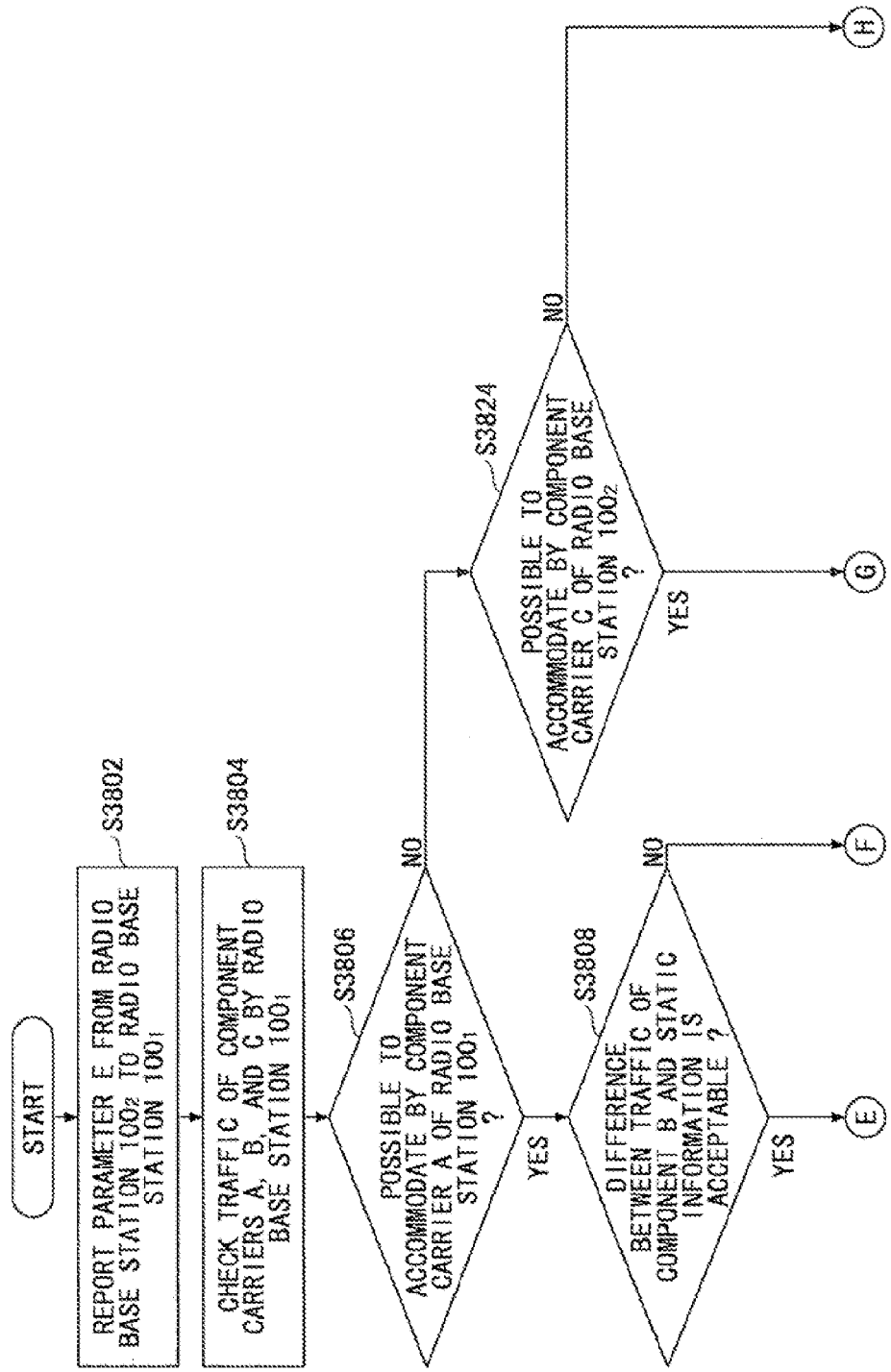

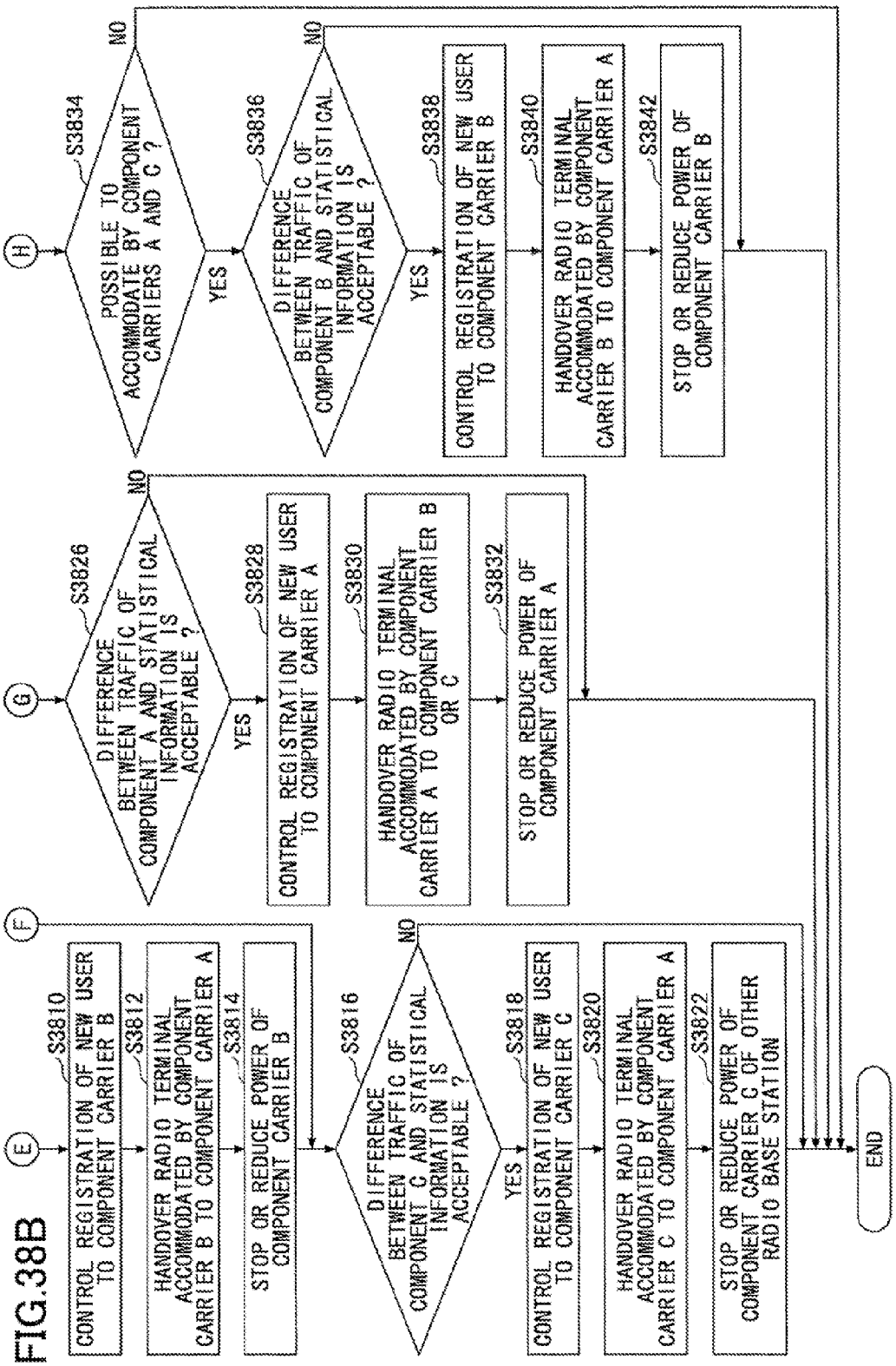

RADIO BASE STATION, BASEBAND PROCESSING APPARATUS, SEMICONDUCTOR INTEGRATED CIRCUIT, RADIO COMMUNICATION SYSTEM AND CONTROL METHOD

CROSS-REFERENCE TO RELATED APPLICATION

This application is based upon and claims the benefit of priority of the prior Japanese Patent Application No. 2012-068321, filed on Mar. 23, 2012, the entire contents of which are incorporated herein by reference.

FIELD

The embodiment discussed herein is related to a radio communication system.

BACKGROUND

As a technology of Long Term Evolution-advanced (LTE-advanced), Carrier Aggregation (CA) is known (see, for example, Japanese Laid-open Patent Publication Nos. 2010-263256 and 2011-176687).

The carrier aggregation is a technique to communicate in wide frequency bands equal to or greater than 20 MHz by using plural Component Carriers (CC). An object of using the carrier aggregation is to improve the peak rate. The component carrier may also be called a "carrier".

FIG. 1 illustrates an example radio communication system supporting the carrier aggregation. The radio communication system illustrated in FIG. 1 uses two component carriers. Those component carriers are expressed as a component carrier A and a component carrier B.

A radius of the cell of the component carrier A is greater than that of the cell of the component carrier B. The difference between the radiuses is based on the difference between the maximum transmission powers of the component carriers A and B.

In the example of FIG. 1, a part of the area of the component carrier A overlaps the area of the component carrier B of a radio base station 10. Therefore, a radio terminal located in the area of the component carrier B may use the bandwidths of the two component carriers A and B. On the other hand, a radio terminal located in the area of the component A and out of the component area B may use the bandwidth of component carrier A. Namely, the radio terminal located in the area that is covered by component carrier A and that is not covered by the component carrier B may use the band width of the component A.

Reference may be made to Japanese Laid-open Patent Publication Nos. 2010-263256 and 2011-176687, 3GPP TS36.213 V10.4.0, December 2011, and 3GPP TS36.300 V11.0.0, December 2011.

SUMMARY

According to an aspect, a radio base station providing a service to a radio terminal by using plural component carriers includes a scheduler preferentially allocating, to the radio terminal, one of the component carriers that has a transmission power dynamic range whose lower limit value is lower than lower limit values of transmission power dynamic ranges of a rest of the component carriers; and a transmitter transmitting a radio signal to the radio terminal by using the allocated component carrier.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 1 illustrates an example radio communication system;

FIG. 3 illustrates an example radio communication system according to an embodiment;

FIG. 6 illustrates an example of maximum transmission power control in a radio communication system according to an embodiment;

FIG. 7 illustrates another example of maximum transmission power control in a radio communication system according to an embodiment;

FIG. 8 illustrates example settings of operating conditions of the radio base station according to an embodiment;

FIG. 10 illustrates an example weight selection part of the radio base station according to an embodiment;

FIG. 11 illustrates example operations of a threshold comparison part of the radio base station according to an embodiment;

FIG. 12 illustrates example transmission power control of the radio base station according to an embodiment;

FIG. 13 illustrates an example functional block diagram of the radio base station according to an embodiment;

FIG. 14 illustrates an example priority order of carriers to be allocated;

FIG. 19 illustrates an example switching of an operational flow;

FIG. 20 illustrates another example switching of an operational flow;

FIG. 23 illustrates example information items included in parameter D;

FIG. 24 illustrates an example cell operating state changing table according to an embodiment;

FIG. 29 illustrates another example of the maximum transmission power control of the radio communication system according to an embodiment;

FIG. 37 illustrates an example cell operating state candidate selection table; and FIGS. 38A and 38B are an example flowchart illustrating another operation of the radio communication system according to an embodiment.

DESCRIPTION OF EMBODIMENT

With respect to allocation of transmission power and frequency band resources, it may be desired to allocate the transmission power and frequency band resources to the radio terminal in a manner that data rate is maximized.

With respect to the transmission power, a radio base station may always allocate the maximum transmission power to the radio terminal because it is not required to limit the transmission power as long as the transmission power is equal to less than the maximum transmission power.

In an intense electric field such as an area near an antenna, it may occur that a transmission power value satisfying a required Signal-to-Interference Ratio (SIR) is lower than a lower limit value of a dynamic range of transmission output of a radio base station.

The radio base station may allocate the lower limit value of the dynamic range of the transmission output to a radio terminal. Namely, even when it is sufficient if the transmission power value satisfying a required Signal-to-Interference Ratio (SIR) is allocated, the lower limit value of a dynamic range of transmission output may be allocated.

In this case, a difference in power between the lower limit value of a dynamic range of transmission output and the transmission power value satisfying a required Signal-to-Interference Ratio (SIR) may be consumed as wasteful power consumption.

According to an embodiment, power consumption may be reduced.

In the following, embodiments are described with reference to the accompanying drawings.

Radio Communication System

A radio communication system includes a radio base station 100.

The radio base station 100 sets transmission power values for its component carriers.

Figure 2:
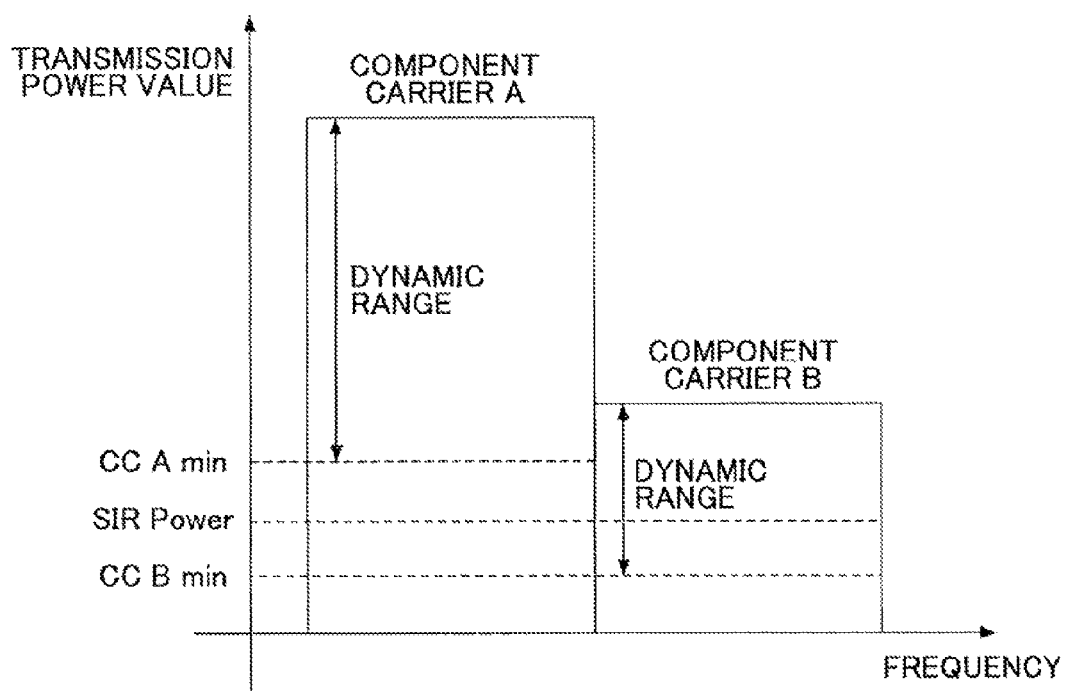
FIG. 2 illustrates an example setting of transmission power values.

FIG. 2 illustrates an example setting of the transmission power values of the component carriers. In FIG. 2, the horizontal axis is frequency and the vertical axis is transmission power value.

FIG. 2 illustrates the setting of the transmission power values of the component carriers A and B. In FIG. 2, the "CC A min" and the "CC B min" denote the lower limit values of the dynamic ranges of the component carriers A and B, respectively. The "SIR Power" denotes the transmission power value satisfying the required SIR of a certain radio terminal.

The lower limit value of the dynamic range may differ depending on, for example, the setting value of the maximum transmission power value. This is because there is the limitation of the data length of the data to be used for control of the dynamic range due to the specifications of the interface between a radio apparatus and a radio control apparatus included in the radio base station 100.

The interface between the radio apparatus and the radio control apparatus includes the Common Public Radio Interface (CPRI). The data length of the data to be used for controlling the dynamic range may be 15 bits.

For example, as illustrated in FIG. 2, the "SIR Power" satisfies the formula: "CC B min"≤"SIR power"<"CC A min". In this case, there may be a case where the "CC A min" is set (allocated) to a radio terminal to which the component carrier A is allocated. Further, there may be a case where the "SIR Power" is set in a radio terminal to which the component carrier B is allocated.

In those cases, with respect to the component carrier A, it is sufficient to set the "SIR Power" in a radio terminal, but the "CC A min" is set in the radio terminal. Therefore, the difference in power values between the "CC A min" and the "SIR Power" (i.e., "CC A min"−"SIR" Power) may be consumed as wasted power consumption. Namely, the difference ("CC A min"−"SIR Power") is the transmission power that may not be necessary to have been allocated to the radio terminal.

Next, a radio base station is described which may be used in an environment where both a radio terminal having greater transmission power and a radio terminal having lower transmission power are located.

In a view of the dynamic range, the greater the difference between two transmission power values becomes, the more the number of bits becomes necessary (the higher the bit accuracy becomes necessary). Due to the higher bit accuracy, the scale (size) of the apparatus may be increased. On the other hand, the smaller the difference between two transmission power values becomes, the smaller the circuit scale becomes.

FIG. 3 illustrates an example of a radio communication system.

As illustrated in FIG. 3, the radio communication system includes the radio base station 100 and a radio terminal 200. The radio base station 100 provides a service by using the carrier aggregation. The carrier aggregation is the technique to communicate using a wideband equal to or greater than 20 MHz by using plural component carriers. By using the carrier aggregation, the peak rate may be improved.

The radio base station 100 covers (forms) cells including the cell formed by using the component carrier A (herein may be referred to as a "cell of the component carrier A") and the cell formed by using the component carrier B (herein may be referred to as a "cell of the component carrier B").

In the example of FIG. 3, there are three cells of the component carrier A and three cells of the component carrier B. However, the radio base station 100 may use the component carrier A to form one or two cells, or may form four or more cells. Similarly, the radio base station 100 may use the component carrier B to form one or two cells, or form four or more cells.

Further, in the case of FIG. 3, the areas (regions) of the cells formed by using the component carrier B are included in the areas of the cells formed by using the component carrier A.

Radio Base Station 100

Figure 4:
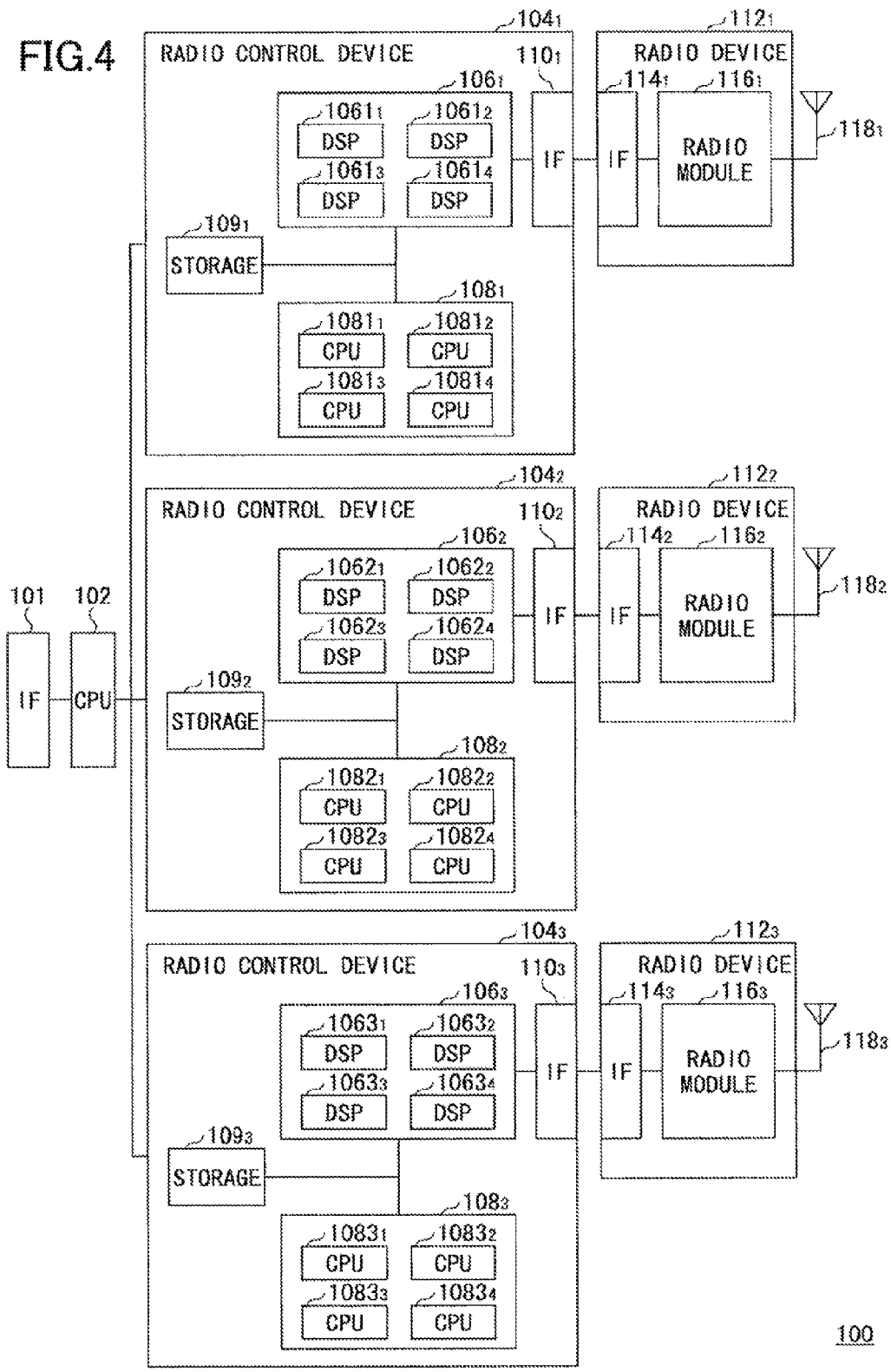
FIG. 4 illustrates an example configuration of a radio base station according to an embodiment.

FIG. 4 illustrates an example of the radio base station 100 according to an embodiment. More specifically, FIG. 4 illustrates an example hardware configuration of the radio base station 100 according to an embodiment.

As illustrated in FIG. 4, the radio base station 100 includes an interface (IF) 101, a Central Processing Unit (CPU) 102, a radio control device (hereinafter may also be referred to as Radio Equipment Control (REC)) 104$_n$ (n: an integer greater than zero), and a radio device (hereinafter may also be referred to as Radio Equipment (RE)) 112$_n$ (n: an integer greater than zero). FIG. 4 illustrates a case where n=3. However, the value of "n" may be one or two or may be four or more.

The radio control device 104$_n$ may also be called a baseband processing device, which, herein, may also be referred to as Base Band Unit (BBU). Further, the radio control device 104$_n$ may be provided as a blade or a semiconductor integrated circuit.

When being provided as a semiconductor integrated circuit, the radio control device 104$_n$ may be provided as one or more semiconductor chips. The radio device 112$_n$ may also be called a Remote Radio Head (RRH).

The radio control device 104$_1$ and the radio device 112$_1$ form one or more cells. Similarly, the radio control device 104$_2$ and the radio device 112$_2$ form one or more cells, and the radio control device 104$_3$ and the radio device 112$_3$ form one or more cells.

The interface 101 is an interface with a network or another radio base station.

The CPU 102 is connected to the interface 101, and performs control for call processing.

The radio control device 104$_n$ is connected to the CPU 102. The radio control device 104$_n$ performs baseband processing.

The radio control device 104$_n$ includes a Digital Signal Processor (DSP) 106$_n$, a CPU 108$_n$, a storage 109$_n$, and an IF 110$_n$.

The DSP 106$_n$ includes a single core or a multi-core processor. In one embodiment of the radio control device 104$_n$, the DSP 106$_n$ includes a four-core processor. Namely, the DSP 106$_n$ includes a DSP 106$_{n1}$, a DSP 106$_{n2}$, a DSP 106$_{n3}$, and a DSP 106$_{n4}$. For example, the DSP 106$_{n1}$ performs call processing. The DSP 106$_{n2}$ performs processing of layer 1. The DSP 106$_{n3}$ performs processing of layer 2. The DSP 106$_{n4}$ performs processing of layer 3.

The CPU 108$_n$ is connected to the DSP 106$_n$. The CPU 108$_n$ includes a single core or a multi-core processor. In one embodiment of the radio control device 104$_n$, the CPU 108$_n$ includes a four-core processor. Namely, the CPU 108$_n$ includes a CPU 108$_{n1}$, a CPU 108$_{n2}$, a CPU 108$_{n3}$, and a CPU 108$_{n4}$. For example, the CPU 108$_{n1}$ performs scheduling processing.

The CPU 108$_{n2}$ performs processing for saving energy. Namely, the CPU 108$_{n2}$ performs control of operating conditions. The CPU 108$_{n3}$ performs control of transmission power. The CPU 108$_4$ performs processing to acquire a parameter to be used for mode change.

The storage 109$_n$ is connected to the DSP 106$_n$ and the CPU 108$_n$. The storage 109$_n$ stores, for example, applications and an Operating System (OS). The application refers to software including functions to execute processing of the radio base station 100.

The Operation System refers to software providing an interface for the application in the radio base station 100. In this case, the interface may be generated by abstracting a concept of hardware.

The IF 110$_n$ is connected to the DSP 106$_n$. The IF 110$_n$ is an interface with the radio device 112$_n$. To that end, the IF 110$_n$ is connected to the radio device 112$_n$ based on, for example, the CPRI (Common Public Radio Interface).

The radio device 112$_n$ performs processing of transmitting a radio signal.

The radio device 112$_n$ includes an interface (IF) 114$_n$, a radio module 116$_n$, and an antenna 118$_n$.

The IF 114$_n$ is an interface with the radio control device 104$_n$. The IF 114$_n$ is connected to the radio control device 104$_n$ based on, for example, the CPRI.

The radio module 116$_n$ is connected to the IF 114$_n$. The radio module 116$_n$ generates a radio signal to be transmitted to the radio terminal 200, and receives a radio signal from the radio terminal 200.

The antenna 118$_n$ is connected to the radio module 116$_n$. The antenna 118$_n$ transmits a radio signal to the radio terminal 200, and receives a radio signal from the radio terminal 200.

Functions of Radio Base Station 100

Next, functions of the radio base station 100 according to an embodiment are described.

The radio base station 100 forms cells A and B by using the component carriers A and B, respectively. To reduce the energy consumption (of the transmission power), the radio base station 100 sets the cells A and B so that the cell radium of the cell B is shorter (less) than the cell radium of the cell A.

Namely, the radio base station 100 decreases the upper limit value of the transmission power to form the cell B. The radio base station 100 preferentially allocates the radio terminal 200 to the cell B. By preferentially allocating the radio terminal 200 to the cell B, the number of the radio terminals performing radio communication in (using) the cell B is increased. In this case, the maximum transmission power value of the cell B is less than the maximum transmission power value of the cell A.

Therefore, the lower limit value of the dynamic range of the transmission power of the cell B becomes lower than that of the cell A. Accordingly, it is generally assumed that the transmission power values allocated to the radio terminals to perform radio communications in the cell B are more likely to be lower than the transmission power values allocated to the radio terminals to perform radio communications in the cell A.

Specifically, it may become possible to reduce the number of cases where the lower limit value of the dynamic range is higher than the transmission power value where the radio terminal satisfies the required SIR.

Accordingly, it may become possible to allocate the transmission power value that satisfies the required SIR even when a radio terminal is located in an intense electric field. As a result, it may become possible to reduce the energy consumption of the entire radio communication system.

According to an embodiment of the radio base station 100, a mode to perform control to reduce the energy consumption by preferentially allocating the radio terminal(s) 200 to the cell B is called a "save mode". On the other hand, a mode to perform a normal operation is called a "normal mode".

Figure 5:
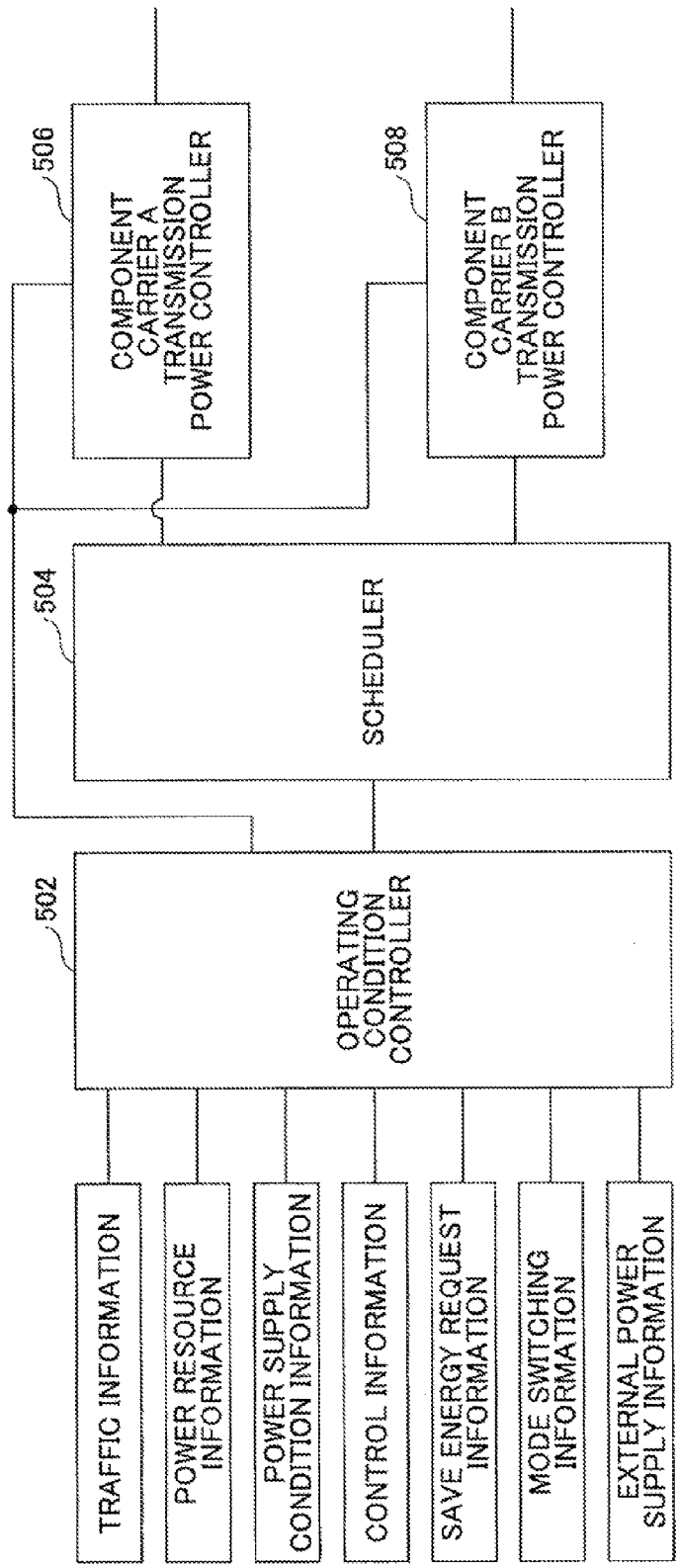
FIG. 5 is an example functional block diagram of the radio base station according to an embodiment.

FIG. 5 is an example functional block diagram of the radio base station 100 according to an embodiment. The functions described in the functional block diagram are executed mainly by the CPU $108_n$. Namely, the functions described in the functional block diagram of FIG. 5 are executed by the CPU $108_n$ based on the application(s) stored in the storage $109_n$.

However, the functions described in the functional block diagram of FIG. 5 may be executed by the CPU $108_n$ based on an application (i.e., firmware) stored in the CPU $108_n$.

The CPU $108_n$ functions as an operating condition controller 502. Specifically, it is the CPU $108_{n2}$ that functions as an operating condition controller 502. The operating condition controller 502 determines whether the mode is to be changed to the "save mode". The operating condition controller 502 reports the result of the determination whether the mode is to be changed to the "save mode" to a scheduler 504. Hereinafter, the result of the determination may be referred to as "save-mode switching information".

The operating condition controller 502 receives traffic information, power resource information, power supply condition information, control information, save energy request information, mode switching information, and external power supply information.

The operating condition controller 502 may further receive an information item indicating the number of antennas ("antenna information") of the radio base station 100.

The traffic information indicates a monitoring result of user resources. Specifically, the traffic information indicates the number of the radio terminals 200. As the traffic information, terms such as "large" or "small" roughly representing the number of the radio terminals 200 may be used.

The power resource information refers to a transmission power value to be allocated to the radio terminal 200. The power resource information indicates a degree of the transmission power value. As the power resource information, terms such as "high" or "low" roughly indicating the degree of the transmission power value may be used.

The degree (e.g., high or low) of the transmission power value indicates whether the radio terminal 200 is located near the cell edge.

The power supply condition information indicates a condition of the system that backs up the radio base station 100. Specifically, the power supply condition information indicates whether the power supplied to the system to backup the radio base station 100 is, for example, high (sufficient) or low (insufficient).

The control information refers to control information from other device. The other device may be, for example, another radio base station or an upper node. The control information includes save mode switching request information that is a request from another device to switch to the save mode.

The save mode switching request information may be control information transmitted from a device that remotely controls the radio base station 100 when the radio base station 100 is remotely controlled by the device. In this case, the control information includes information requesting to switch to the save mode.

The mode switching information is control information to be output when a mode switch provided on the radio base station 100 is operated. The control information include information requesting for changing to the save mode.

The external power supply information indicates whether power is being externally supplied.

The operating condition controller 502 sets the maximum transmission power values for the component carriers. Specifically, in normal mode, the operating condition controller 502 sets the respective maximum transmission power values for the cells A and B so as to support the entire cells (cell areas) that may be maximally covered.

Namely, in normal mode, there may be a case where the lower limit values of the dynamic ranges of plural component carriers are substantially equal to each other.

On the other hand, when determining that the normal mode is to be changed to the save mode, while the operating condition controller 502 sets the maximum transmission power value for the cell A so as to support communications in the entire area of the cell A that may be maximally covered, the operating condition controller 502 further sets the maximum transmission power value for the cell B so as to support (only) a part of the entire area of the cell B that may be maximally covered.

In this case, the size of the cell A to be covered may be substantially equal to or different from the size of the cell B to be covered. Namely, in save mode, there may be a case where the lower limit value(s) of some of the component carriers is lower than the lower limit value(s) of the rest of the component carriers when plural component carriers are used.

Further, in normal mode, the carrier aggregation where plural component carriers are allocated to a single radio terminal may be permitted (used). On the other hand, in save mode, the carrier aggregation where plural component carriers are allocated to a single radio terminal may be controlled.

The operating condition controller 502 transmits the information to set the maximum transmission power value (hereinafter may be referred to as "maximum transmission power setting information") in a component carrier A transmission power controller 506 and a component carrier B transmission power controller 508.

Further, when determining that the normal mode is to be changed to the save mode, the operating condition controller 502 may control to limit (reduce) the number of antennas to be used for the transmission. By doing this, the energy consumption may be further reduced.

The CPU $108_n$ functions as the scheduler 504. Specifically, it is the CPU $108_{n1}$ that functions as the scheduler 504. The scheduler 504 is connected to the operating condition controller 502. The scheduler 504 performs scheduling that allocates the radio terminal 200 to the cell.

Upon the normal mode being switched to the save mode based on the "save-mode switching information" from the operating condition controller 502, the scheduler 504 performs scheduling so that the radio terminal(s) 200 may be preferentially allocated to the cell B.

Namely, upon switching to the save mode, the scheduler 504 allocates the radio terminal(s) 200 mainly to the component carrier B. By allocating the radio terminal(s) 200 (mainly) to the component carrier B, the radio terminal(s) 200 located in the area where the cells A and B are overlapped with each other (overlapped area of the cells A and B) perform radio communications by (mainly) using the component carrier B.

On the other hand, the radio terminal(s) 200 located in the area that is included in the cell A and that is other than the overlapped area of the cells A and B perform radio communications by using the component carrier A. The scheduler 504 transmits the information indicating the result of the scheduling to the component carrier A transmission power controller 506 and the component carrier B transmission power controller 508.

In save mode, in the cell B, the maximum transmission power value is set so that (only) a part of the maximum cell radius of the cell B may be supported (covered). Therefore, it may be assumed that the lower limit value of the dynamic range of the cell B is lower than the lower limit value of the dynamic range of the cell A.

By allocating the radio terminal to the cell A, there may be a case where power may be wastefully consumed due to the difference between the lower limit value of the dynamic range and the transmission power value (minimally) satisfying the (required) SIR.

However, by allocating the radio terminal to the cell B, the wasteful power consumption may be reduced. Accordingly, it may become possible to reduce the power consumption of the entire radio communication system.

The CPU 108$_n$ functions as the component carrier A transmission power controller 506. Specifically, it is the CPU 108$_{n2}$ that functions as the component carrier A transmission power controller 506. The component carrier A transmission power controller 506 is connected to the operating condition controller 502 and the scheduler 504.

The component carrier A transmission power controller 506 performs transmission power control that controls the transmission power value of the radio terminal to which the component carrier A is allocated. Specifically, based on the "maximum transmission power setting information" from the operating condition controller 502, the component carrier A transmission power controller 506 controls the transmission power value to be allocated to the radio terminal to which the component carrier A is allocated.

Further, the component carrier A transmission power controller 506 controls so that the required SIR of the radio terminal is satisfied and the maximum transmission power value is in the range of the dynamic range of the component carrier A. The component carrier A transmission power controller 506 transmits information to the DSP 106$_n$, the information indicating the transmission power value to be allocated to the radio terminal 200.

The CPU 108$_n$ functions as the component carrier B transmission power controller 508. Specifically, it is the CPU 108$_{n3}$ that functions as the component carrier B transmission power controller 508. The component carrier B transmission power controller 508 is connected to the operating condition controller 502 and the scheduler 504.

The component carrier B transmission power controller 508 performs transmission power control that controls the transmission power value of the radio terminal to which the component carrier B is allocated. Specifically, based on the "maximum transmission power setting information" from the operating condition controller 502, the component carrier B transmission power controller 508 controls the transmission power value to be allocated to the radio terminal to which the component carrier B is allocated.

Further, the component carrier B transmission power controller 508 controls so that the required SIR of the radio terminal is satisfied and the maximum transmission power value is in the range of the dynamic range of the component carrier B. The component carrier B transmission power controller 508 transmits information to the DSP 106$_n$, the information indicating the transmission power value to be allocated to the radio terminal 200.

FIG. 6 illustrates an example of cells A and B in normal mode where the cells A and B are formed by using the component carriers A and B, respectively. In normal mode, the respective maximum transmission power values are set to the cells A and B so as to support the entire cells that may be maximally covered. In the example of FIG. 6, the areas of the cells A and B are set so as to be substantially equal to each other.

FIG. 7 illustrates an example of cells A and B in save mode where the cells A and B are formed by using the component carriers A and B, respectively.

In save mode, the maximum transmission power value is set in the cell A so as to support the entire cell that may be maximally covered. On the other hand, the maximum transmission power value is set to the cell B so as to support only a part of the entire cell that may be maximally covered. Therefore, the size of the cell B may be smaller than the size of the cell A as illustrated in FIG. 7.

Process to Determine Whether to Switch to Save Mode (1)

FIG. 8 illustrates an example operating condition determination table to be used when determining whether to switch to the save mode by the operating condition controller 502. Namely, the operating condition controller 502 determines whether to switch to the save node based on the operating condition determination table.

The operating condition determination table illustrated in FIG. 8 indicates correspondence between combinations of the information items to be input to the operating condition controller 502 and an information item indicating whether to switch to the save mode. In the operating condition determination table illustrated in FIG. 8, there are seven information items to be input to the operating condition controller 502; therefore, the number of the combinations of the seven information items is 128 patterns.

Therefore, the determination whether to switch to the save mode may be made for each of the 128 patterns. Otherwise, the determination may be made for only predetermined patterns of the 128 patterns.

For example, the item 1 indicates the combination that "traffic information": "small", "power resource information": "low", "power supply condition information": "low", "control information": "requested", "save energy request information" "requested", "mode switching information": "requested", and "external power supply information": "not supplied". In this case, the operating condition controller 502 outputs "ON" as the "save-mode switching information" indicating to switch to the save mode.

Process to Determine Whether to Switch to Save Mode (2)

Upon determining whether to switch to the save mode, the operating condition controller 502 may put weights on the input information items. Namely, the operating condition controller 502 may determine whether to switch to the save mode based on the weighted information items.

For example, a case is described where based on the external power supply information, weight is put on the power supply condition information. However, for example, the weight may be put on another information item.

The contents of the information items (parameters) to be input may be digitized as described below.

The parameter of the "traffic information" is set to "0" or "1" when the data of the traffic information indicate "large" or "small", respectively. The parameter of the "power resource information" is set to "0" or "1" when the data of the power resource information indicate "high" or "low", respectively. The parameter of the "power supply condition information" is set to "0" or "1" when the data of the power supply condition information indicate "low" or "high", respectively.

The parameter of the "control information" is set to "0" or "1" when the data of the control information indicate "not requested" or "requested", respectively. The parameter of the "save energy request information" is set to "0" or "1" when the data of the save energy request indicate "not requested" or "requested", respectively. The parameter of the "mode switching information" is set to "0" or "1" when the data of the mode switching information indicate "not requested" or "requested", respectively.

Further, the weight of the parameters to be input is expressed using alphanumeric codes. Specifically, the weight of the traffic information is set at "W1". The weight of the power resource information is set at "W2". The weight of the power supply condition information is set at "W3" or "W4" when the external power supply information indicates "supplied" or "not supplied", respectively.

The weight of the control information is set at "W5". The weight of the save energy request information is set at "W6". The weight of the mode switching information is set at "W7".

Figure 9:
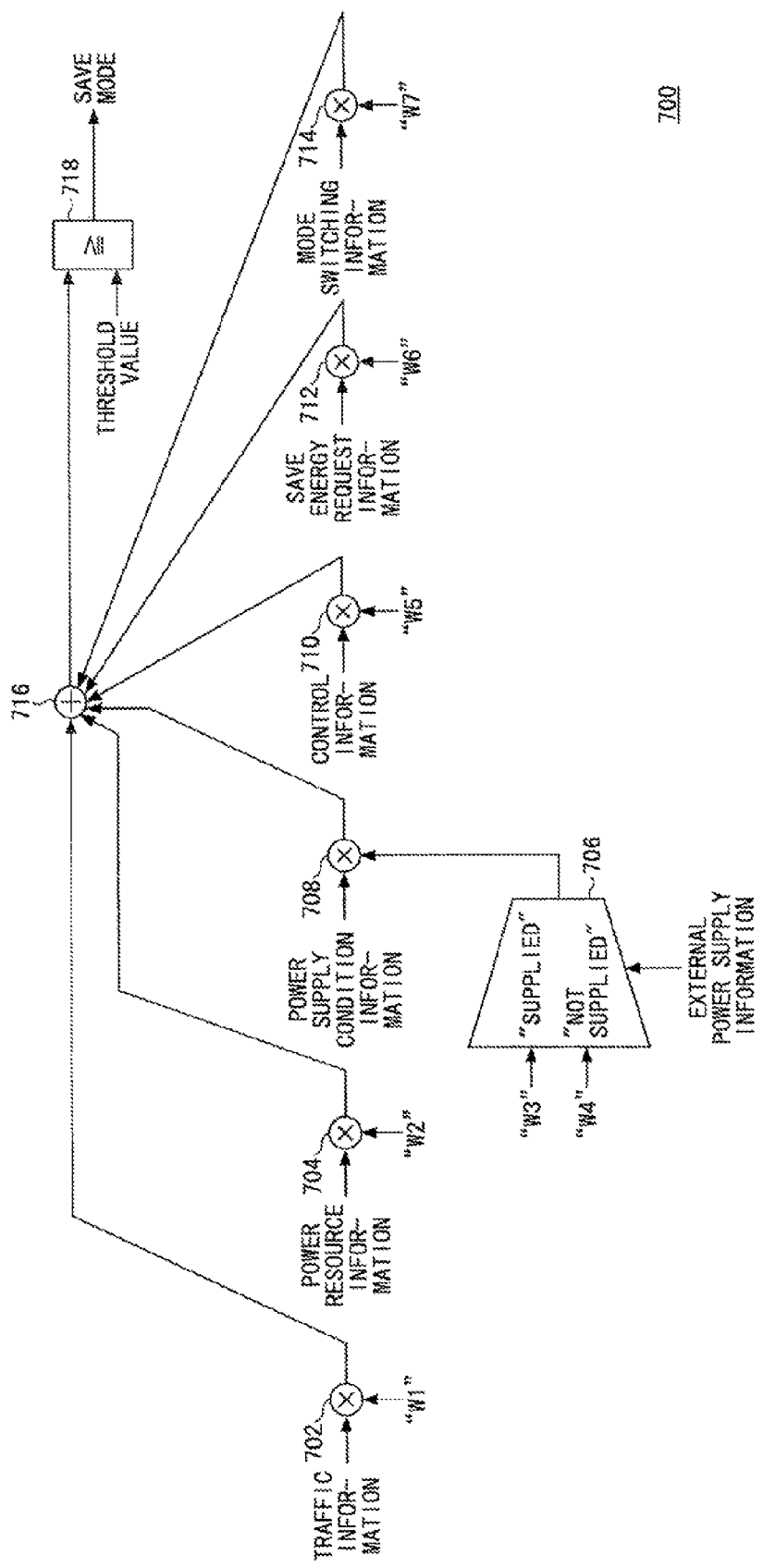
FIG. 9 illustrates an example power-saving mode switching determination circuit of a radio base station according to an embodiment.

FIG. 9 illustrates an example of a save mode switching determinator 700 determining whether to switch to the save mode. The save mode switching determinator 700 may be included in the operating condition controller 502.

The save mode switching determinator 700 includes multipliers 702, 704, 708, 710, 712, and 714, a weight selector 706, an adder 716, and a threshold comparator 718.

The multiplier 702 multiplies the digitized traffic information by the weight "W1". The multiplier 702 sends the multiplied result (calculation result) to the adder 716.

The multiplier 704 multiplies the digitized power resource information by the weight "W2". The multiplier 704 sends the multiplied result (calculation result) to the adder 716.

FIG. 10 illustrates an example process executed by the weight selector 706.

As illustrated in FIG. 10, when determining that the data of the external power supply information indicates "supplied", the weight selector 706 output the weight "W3". On the other hand, when determining that the data of the external power supply information indicates "not supplied", the weight selector 706 output the weight "W4".

The multiplier 708 is connected to the weight selector 706. The multiplier 708 multiplies the digitized power supply condition information by the weight supplied from the weight selector 706. The multiplier 708 sends the multiplied result (calculation result) to the adder 716.

The multiplier 710 multiplies the digitized control information by the weight "W5". The multiplier 710 sends the multiplied result (calculation result) to the adder 716.

The multiplier 712 multiplies the digitized save energy request information by the weight "W6". The multiplier 712 sends the multiplied result (calculation result) to the adder 716.

The multiplier 714 multiplies the digitized mode switching information by the weight "W7". The multiplier 714 sends the multiplied result (calculation result) to the adder 716.

The adder 716 is connected to the multipliers 702, 704, 708, 710, 712, and 714. The adder 716 obtains the sum (added value) of the multiplied results from the multipliers 702, 704, 708, 710, 712, and 714 by adding the multiplied results. The adder 716 sends the sum (added value) to the threshold comparator 718.

The threshold comparator 718 is connected to the adder 716. The threshold comparator 718 compares the sum from the adder 716 with a threshold value to obtain a comparison result, and determines whether to switch to the save mode based on the comparison result.

The FIG. 11 illustrates an example process executed by the threshold comparator 718.

The threshold comparator 718 determines to set (switch to) the save mode when determining that the sum (added value) from the adder 716 is greater than or equal to the threshold value ("truth").

In this case, the threshold comparator 718 outputs the "save-mode switching information" indicating to switch to the save mode. The "save-mode switching information" from the threshold comparator 718 is sent to the scheduler 504, the component carrier A transmission power controller 506, and the component carrier B transmission power controller 508.

Further, the threshold comparator 718 determines not to set (switch to) the save mode when determining that the sum (added value) from the adder 716 is less than the threshold value ("false"). In this case, the threshold comparator 718 may output the "save-mode switching information" indicating not to switch to the save mode.

The "save-mode switching information" from the threshold comparator 718 may be sent to the scheduler 504, the component carrier A transmission power controller 506, and the component carrier B transmission power controller 508.

Method of Setting Maximum Transmission Power Value of Cell

The operating condition controller 502 may set the respective maximum transmission power values of the cells based on the power supply condition information.

FIG. 12 illustrates an example of a maximum transmission power setting table to be used to set the maximum transmission power value.

In a case where the power supply condition information indicates that the battery has no charge, the operating condition controller 502 outputs, as the "maximum transmission power setting information", the information indicating to stop the component carrier.

In a case where the power supply condition information indicates that there is charge remaining in the battery, the operating condition controller 502 output, as the "maximum transmission power setting information", the information indicating to reduce the maximum transmission power value by X dB. The value "X" may be determined based on the remaining amount of the battery.

In a case where the power supply condition information indicates that there is sufficient charge in the battery, the operating condition controller 502 output, as the "maximum transmission power setting information", the information indicating to set the maximum transmission power value to the maximum value.

Scheduling Method (1)

The scheduler 504 separately registers radio terminals in advance in the cell A where a higher maximum transmission value is set and the cell B where a lower maximum transmission value is set. The scheduler 504 allocates the radio terminals using the cells as a unit.

FIG. 13 illustrates example processes executed by the scheduler 504 (an example functional block diagram of the scheduler 504). For explanatory purposes, FIG. 13 further illustrates the operating condition controller 502 and the like.

Also, for explanatory purposes, FIG. 13 illustrates a case of the Long Term Evolution (LTE). However, it should be noted that the present invention may also be applied to, for example the LTE-Advanced. FIG. 13 illustrates a case where three component carriers are formed (used). However, the number of the component carriers to be formed (used) may be two or more than three.

The operating condition controller 502 determines whether to switch to the save mode based on parameters A, B, C and the like. Here, the parameters A, B, C, and the like include the above-described traffic information, power resource information, power supply condition information, control information, save energy request information, mode switching information, and the like.

The CPU $108_n$ functions as a component carrier selector 510. Specifically, it is the CPU $108_{n1}$ that functions as the component carrier selector 510. The component carrier selector 510 is connected to the operating condition controller 502. The component carrier selector 510 sets a priority order (priority levels) of the component carriers to which the radio terminals are allocated.

Specifically, the component carrier selector 510 sets the priority order of the component carriers to which the radio terminals are allocated based on the corresponding maximum transmission power values of the component carriers. For example, a case is described where three component carriers are used and the corresponding maximum transmission power values of the component carriers are different from each other.

FIG. 14 illustrates an example setting of the priority order of the component carriers.

The component carrier selector 510 sets the priority order of the component carriers so that a priority level of the component carriers decreases in the increasing order of the maximum transmission power values as illustrated in FIG. 14.

The component carrier selector 510 sequentially selects the candidates of the radio terminals to be allocated to the component carriers in accordance with the priority order of the component carriers to which the radio terminals are to be allocated. The component carrier selector 510 sends information to a user selector $512_1$, the information indicating the candidates of the radio terminals to be allocated to the component carrier A.

Further, the component carrier selector 510 sends information to a user selector $512_2$, the information indicating the candidates of the radio terminals to be allocated to the component carrier B. Further, the component carrier selector 510 sends information to a user selector $512_3$, the information indicating the candidates of the radio terminals to be allocated to the component carrier C.

The CPU $108_n$ functions as a user selector $512_1$. Specifically, it is the CPU $108_{n1}$ that functions as the user selector $512_1$. The user selector $512_1$ is connected to the component carrier selector 510. The user selector $512_1$ selects the radio terminal to be allocated to the cell A based on the information indicating the radio terminals selected as the candidates to be allocated to the component carrier A, the information being received from the component carrier selector 510. The user selector $512_1$ sends the information indicating the radio terminal to be allocated to the component carrier A to a channel encoder $514_1$ and a channel decoder $518_1$.

The DSP $106_1$ functions as the channel encoder $514_1$. The channel encoder $514_1$ is connected to the user selector $512_1$. The channel encoder $514_1$ encodes a downlink signal to the radio terminal to be allocated to the cell A based on the information indicating the radio terminal to be allocated to the cell A, the information being from the user selector $512_1$.

For example, the channel encoder $514_1$ maps a signal to the component carrier A, the signal being the downlink signal to the radio terminal to be allocated to the cell A. The downlink signal includes setting information including the information of the component carrier A. The setting information is transmitted to the radio terminal to be allocated to the cell A.

Specifically, the setting information is transmitted to the radio terminal before the radio terminal allocated to the cell A starts transmitting a radio signal by using the cell A. For example, the channel encoder $514_1$ may perform turbo encoding. The channel encoder $514_1$ sends the channel-encoded downlink signal to an OFDM (Orthogonal Frequency Division Multiplexing) signal generator $516_1$.

The DSP $106_1$ functions as the OFDM signal generator $516_1$. The OFDM signal generator $516_1$ is connected to the channel encoder $514_1$. Based on the channel-encoded downlink signal from the channel encoder $514_1$, the OFDM signal generator $516_1$ generates an OFDM signal to be transmitted in the cell A. Specifically, the OFDM signal generator $516_1$ generates the OFDM signal by performing inverse Fourier transformation on the channel-encoded downlink signal from the channel encoder $514_1$ and inserting a cyclic prefix (CP). The OFDM signal generator $516_1$ transmits the OFDM signal.

The DSP $106_1$ functions as an SC-FDMA (Single-Carrier Frequency-Division Multiple) decoder $520_1$. The SC-FDMA decoder $520_1$ decodes symbols included in an uplink signal from the radio terminal 200. Specifically, the SC-FDMA decoder $520_1$ removes the CP from and performs Fourier transformation or discrete Fourier transformation on the uplink signal. The SC-FDMA decoder $520_1$ sends the symbol-decoded uplink signal to the channel decoder $518_1$.

The DSP $106_1$ functions as the channel decoder $518_1$. The channel decoder $518_1$ is connected to the SC-FDMA decoder $520_1$ and the user selector $512_1$. The channel decoder $518_1$ performs channel decoding on the symbol-decoded uplink signal from the SC-FDMA decoder $520_1$ based on the information indicating the radio terminal 200 is to be allocated to the cell A from the user selector $512_1$. Specifically, the channel decoder $518_1$ performs turbo decoding on the symbol-decoded uplink signal from the SC-FDMA decoder $520_1$.

The DSP $106_1$ functions as the user selector $512_2$. Specifically, it is the CPU $108_{n1}$ that functions as the user selector $512_2$. The user selector $512_2$ is connected to the component carrier selector 510.

The user selector $512_2$ selects the radio terminal to be allocated to the cell B based on the information indicating the radio terminals selected as the candidates to be allocated to the component carrier B, the information being received from the component carrier selector 510. The user selector $512_2$ sends the information indicating the radio terminal to be allocated to the component carrier B to a channel encoder $514_2$ and a channel decoder $518_2$.

The DSP $106_1$ functions as the channel encoder $514_2$. The channel encoder $514_2$ is connected to the user selector $512_2$. The channel encoder $514_2$ encodes a downlink signal to the radio terminal to be allocated to the cell B based on the information indicating the radio terminal to be allocated to the cell B, the information being from the user selector $512_2$.

For example, the channel encoder $514_2$ maps a signal to the component carrier B, the signal being the downlink signal to the radio terminal to be allocated to the cell B. The downlink signal includes setting information including the information of the component carrier B. The setting information is transmitted to the radio terminal to be allocated to the cell B.

Specifically, the setting information is transmitted to the radio terminal before the radio terminal allocated to the cell B starts transmitting a radio signal by using the cell B. For example, the channel encoder $514_2$ may perform turbo encoding. The channel encoder $514_2$ sends the channel-encoded downlink signal to an OFDM signal generator $516_2$.

The DSP $106_1$ functions as the OFDM signal generator $516_2$. The OFDM signal generator $516_2$ is connected to the channel encoder $514_2$. Based on the channel-encoded downlink signal from the channel encoder $514_2$, the OFDM signal generator $516_2$ generates an OFDM signal to be transmitted in the cell B.

Specifically, the OFDM signal generator $516_2$ generates the OFDM signal by performing inverse Fourier transformation on the channel-encoded downlink signal from the channel encoder $514_2$ and inserting a cyclic prefix (CP). The OFDM signal generator $516_2$ transmits the OFDM signal.

The DSP $106_1$ functions as an SC-FDMA decoder $520_2$. The SC-FDMA decoder $520_2$ decodes symbols included in an uplink signal from the radio terminal 200. Specifically, the SC-FDMA decoder $520_2$ removes the CP from and performs Fourier transformation or discrete Fourier transformation on the uplink signal. The SC-FDMA decoder $520_2$ sends the symbol-decoded uplink signal to the channel decoder $518_2$.

The DSP $106_1$ functions as the channel decoder $518_2$. The channel decoder $518_2$ is connected to the SC-FDMA decoder $520_2$ and the user selector $512_2$. The channel decoder $518_2$ performs channel decoding on the symbol-decoded uplink signal from the SC-FDMA decoder $520_2$ based on the information indicating the radio terminal 200 to be allocated to the cell B from the user selector $512_2$. Specifically, the channel decoder $518_2$ performs turbo decoding on the symbol-decoded uplink signal from the SC-FDMA decoder $520_2$.

The DSP $106_1$ functions as the user selector $512_3$. Specifically, it is the CPU $108_{n1}$ that functions as the user selector $512_3$. The user selector $512_3$ is connected to the component carrier selector 510. The user selector $512_3$ selects the radio terminal to be allocated to the cell C based on the information indicating the radio terminals selected as the candidates to be allocated to the component carrier C, the information being received from the component carrier selector 510. The user selector $512_3$ sends the information indicating the radio terminal to be allocated to the component carrier C to a channel encoder $514_3$ and a channel decoder $518_3$.

The DSP $106_1$ functions as the channel encoder $514_3$. The channel encoder $514_3$ is connected to the user selector $512_3$. The channel encoder $514_3$ encodes a downlink signal to the radio terminal to be allocated to the cell C based on the information indicating the radio terminal to be allocated to the cell C, the information being from the user selector $512_3$.

For example, the channel encoder $514_3$ maps a signal to the component carrier C, the signal being the downlink signal to the radio terminal to be allocated to the cell C. The downlink signal includes setting information including the information of the component carrier C.

The setting information is transmitted to the radio terminal to be allocated to the cell C. Specifically, the setting information is transmitted to the radio terminal before the radio terminal allocated to the cell C starts transmitting a radio signal by using the cell C. For example, the channel encoder $514_3$ may perform turbo encoding. The channel encoder $514_3$ sends the channel-encoded downlink signal to an OFDM signal generator $516_3$.

The DSP $106_1$ functions as the OFDM signal generator $516_3$. The OFDM signal generator $516_3$ is connected to the channel encoder $514_3$. Based on the channel-encoded downlink signal from the channel encoder $514_3$, the OFDM signal generator $516_3$ generates an OFDM signal to be transmitted in the cell C.

Specifically, the OFDM signal generator $516_3$ generates the OFDM signal by performing inverse Fourier transformation on the channel-encoded downlink signal from the channel encoder $514_3$ and inserting a cyclic prefix (CP). The OFDM signal generator $516_3$ transmits the OFDM signal.

The DSP $106_1$ functions as an SC-FDMA decoder $520_3$. The SC-FDMA decoder $520_3$ decodes symbols included in an uplink signal from the radio terminal 200. Specifically, the SC-FDMA decoder $520_3$ removes the CP from and performs Fourier transformation or discrete Fourier transformation on the uplink signal. The SC-FDMA decoder $520_3$ sends the symbol-decoded uplink signal to the channel decoder $518_3$.

The DSP $106_1$ functions as the channel decoder $518_3$. The channel decoder $518_3$ is connected to the SC-FDMA decoder $520_3$ and the user selector $512_3$. The channel decoder $518_3$ performs channel decoding on the symbol-decoded uplink signal from the SC-FDMA decoder $520_3$ based on the information indicating the radio terminal 200 to be allocated to the cell C from the user selector $512_3$. Specifically, the channel decoder $518_3$ performs turbo decoding on the symbol-decoded uplink signal from the SC-FDMA decoder $520_3$.

Operation of Radio Base Station 100 (1)

Figure 15A:
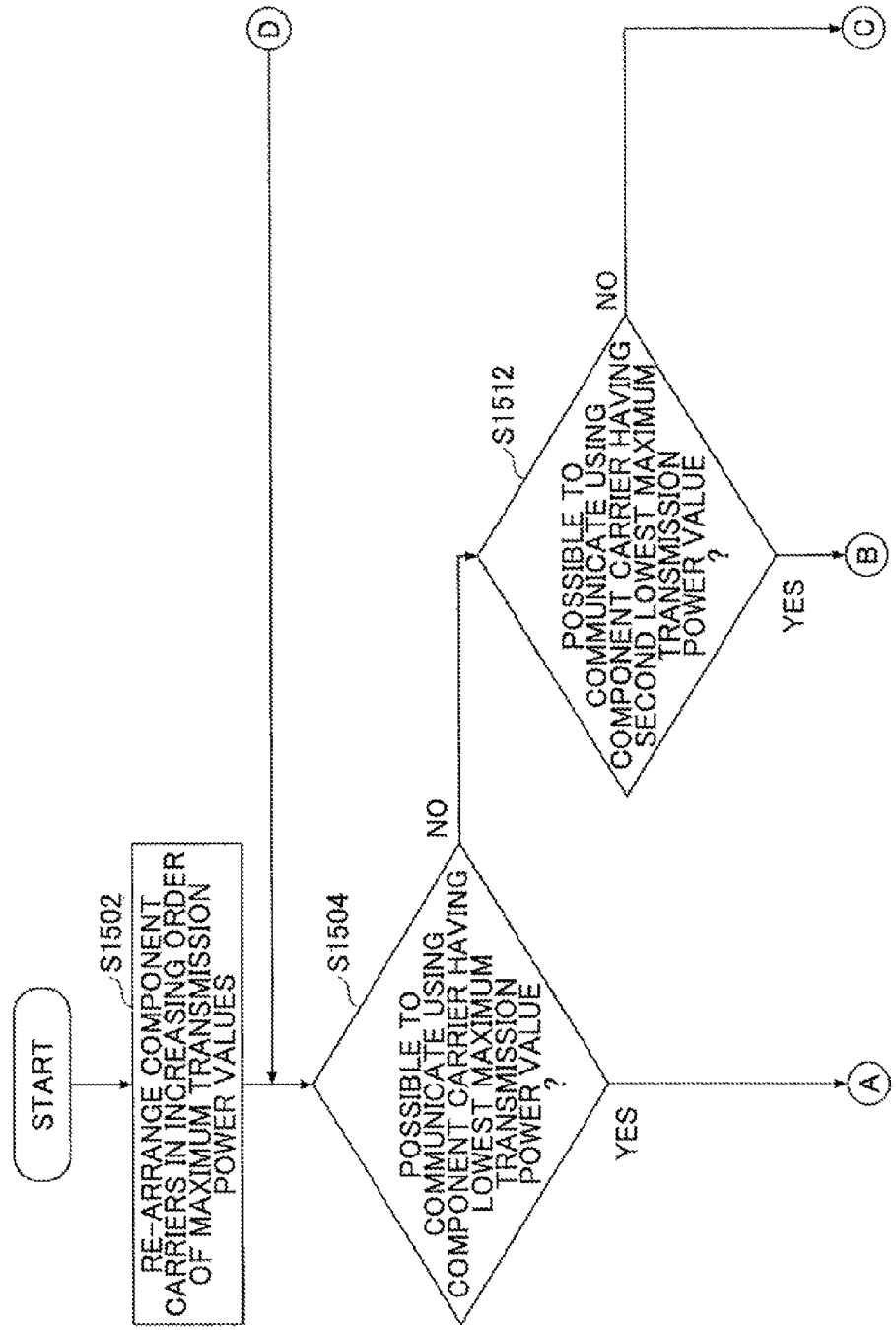
FIGS. 15A and 15B are an example flowchart illustrating an operation of the radio base station.
Figure 15B:
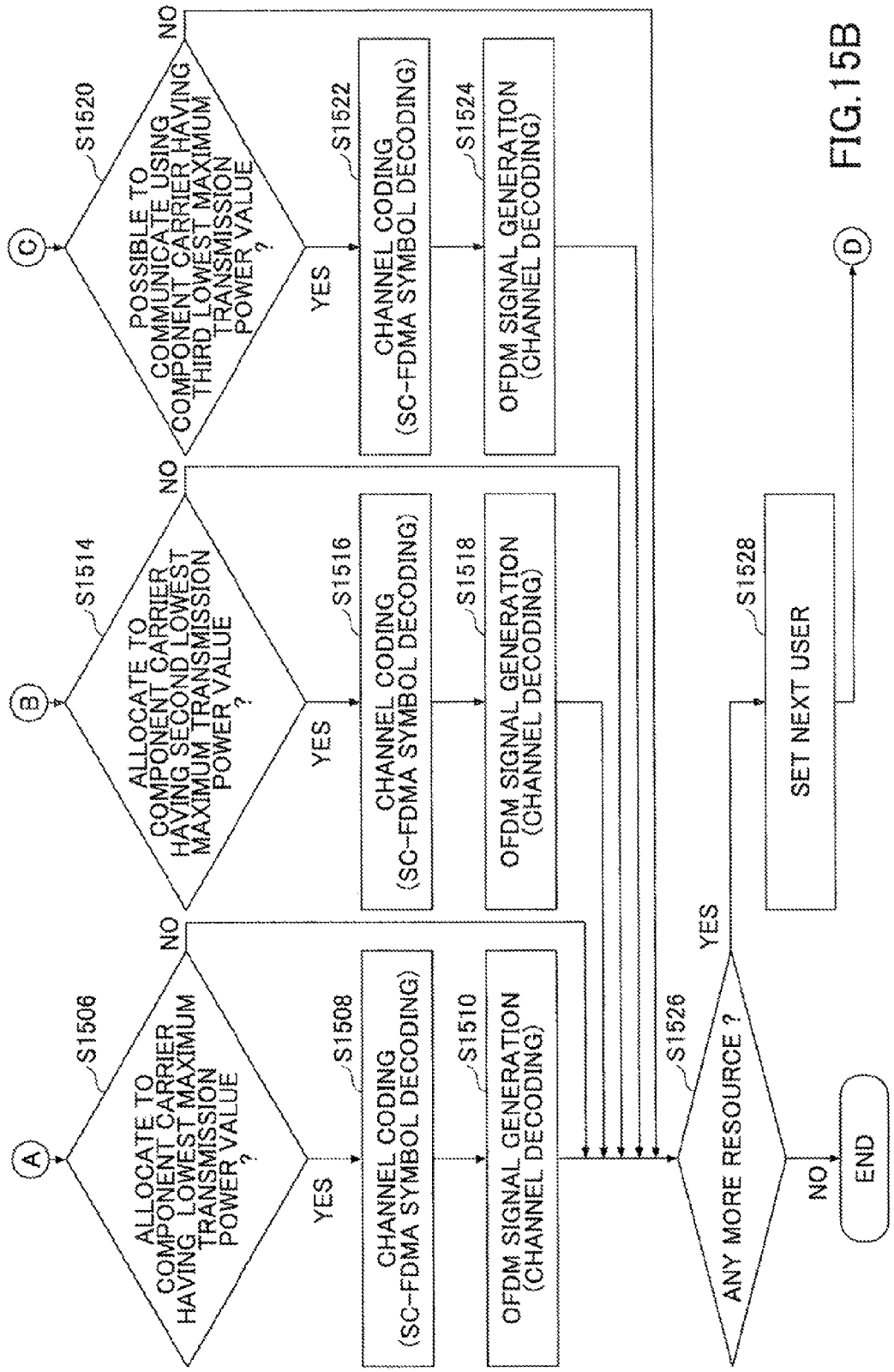

FIGS. 15A and 15B are an example flowchart illustrating operations of the radio base station 100.

In the operations of FIGS. 15A and 15B, it is assumed that the radio base station 100 forms (uses) three component carriers A, B, and C. Further, the respective maximum transmission power values of the three components are different from each other. In FIGS. 15A and 15B, a case is described where it is assumed that the maximum transmission power values of the component carriers are increased in the order of the component carriers A, B, and C.

In step S1502, the component carrier selector 510 arranges (re-arranges) the component carriers in the increasing order of the maximum transmission power values of the component carriers.

In step S1504, the component carrier selector 510 determines whether it is possible to communicate by using the component carrier having the lowest maximum transmission power value. When determining that it is possible to communicate by using the component carrier having the lowest maximum transmission power value, the process goes to step S1506. On the other hand, when determining that it is not possible to communicate by using the component carrier having the lowest maximum transmission power value, the process goes to step S1512.

In step S1506, the user selector $512_1$ determines whether to allocate the radio terminal 200 to the component carrier having the lowest maximum transmission power value.

When determining to allocate the radio terminal 200 to the component carrier having the lowest maximum, the process goes to step S1508. On the other hand, when determining not to allocate the radio terminal 200 to the component carrier having the lowest maximum, the process goes to step S1526.

In step S1508, the channel encoder $514_1$ maps the downlink signal to the radio terminal 200 to the component carrier having the lowest maximum transmission power value. The downlink signal includes the setting information including the information of the component carrier A having the lowest maximum transmission power value.

The setting information is sent (transmitted) to the radio terminal 200. Specifically, the setting information is transmitted to the radio terminal 200 before the radio terminal 200 starts transmitting a radio signal by using the component carrier A.

The channel encoder $514_1$ performs channel coding on the data to be transmitted to the radio terminal 200.

Alternatively, in step S1508, the SC-FDMA decoder $520_1$ may decode SC-FDMA symbols included in an uplink signal from the radio terminal 200.

In step S1510, the OFDM signal generator $516_1$ generates the OFDM signal based on the signal channel-encoded in step S1508.

Alternatively, in step S1510, channel-decoding may be performed on the signal SC-FDMA symbol decoded in step S1508.

In step S1512, the component carrier selector 510 determines whether it is possible to communicate by using the component carrier having the second lowest maximum transmission power value. When determining that it is possible to communicate by using the component carrier having the second lowest maximum transmission power value, the process goes to step S1514.

On the other hand, when determining that it is not possible to communicate by using the component carrier having the second lowest maximum transmission power value, the process goes to step S1520.

In step S1514, the user selector $512_2$ determines whether to allocate the radio terminal 200 to the component carrier having the second lowest maximum transmission power value. When determining to allocate the radio terminal 200 to the component carrier having the second lowest maximum, the process goes to step S1516. On the other hand, when determining not to allocate the radio terminal 200 to the component carrier having the second lowest maximum, the process goes to step S1526.

In step S1516, the channel encoder $514_2$ maps the downlink signal to the radio terminal 200 to the component carrier having the second lowest maximum transmission power value. The downlink signal includes the setting information including the information of the component carrier B having the second lowest maximum transmission power value. The setting information is sent (transmitted) to the radio terminal 200. Specifically, the setting information is transmitted to the radio terminal 200 before the radio terminal 200 starts transmitting a radio signal by using the component carrier B.

The channel encoder $514_2$ performs channel coding on the data to be transmitted to the radio terminal 200.

Alternatively, in step S1516, the SC-FDMA decoder $520_2$ may decode SC-FDMA symbols included in an uplink signal from the radio terminal 200.

In step S1518, the OFDM signal generator $516_2$ generates the OFDM signal based on the signal channel-encoded in step S1516.

Alternatively, in step S1518, channel-decoding may be performed on the signal SC-FDMA symbol decoded in step S1516.

In step S1520, the user selector $512_3$ (component carrier selector 510) determines whether it is possible to communicate by using the component carrier having the third lowest maximum transmission power value. When determining that it is possible to communicate by using the component carrier having the third lowest maximum transmission power value, the process goes to step S1522. On the other hand, when determining that it is not possible to communicate by using the component carrier having the third lowest maximum transmission power value, the process goes to step S1526.

In step S1522, the channel encoder $514_3$ maps the downlink signal to the radio terminal 200 to the component carrier having the third lowest maximum transmission power value. The downlink signal includes the setting information including the information of the component carrier C having the third lowest maximum transmission power value. The setting information is sent (transmitted) to the radio terminal 200. Specifically, the setting information is transmitted to the radio terminal 200 before the radio terminal 200 starts transmitting a radio signal by using the component carrier C.

The channel encoder $514_3$ performs channel coding on the data to be transmitted to the radio terminal 200.

Alternatively, in step S1522, the SC-FDMA decoder $520_3$ may decode SC-FDMA symbols included in an uplink signal from the radio terminal 200.

In step S1524, the OFDM signal generator $516_3$ generates the OFDM signal based on the signal channel-encoded in step S1522.

Alternatively, in step S1524, channel-decoding may be performed on the signal SC-FDMA symbol decoded in step S1522.

In step S1526, it is determined whether there is a resource after the OFDM signal is generated in step S1510, S1518, or S1524 or after channel-decoding is performed on the SC-FDMA symbol decoded signal.

Alternatively, in step S1526, it is determined whether there is a resource when determining not to allocate the radio terminal 200 to the component carrier in step S1506, S1514, or S1520. When determining that there is a resource, the process goes to step S1528.

In step S1528, the next radio terminal is set. Then, the process goes back to step SS1504.

When determining that there is no resource in step S1526, the process ends.

Operation of Radio Base Station 100 (2)

Figure 16:
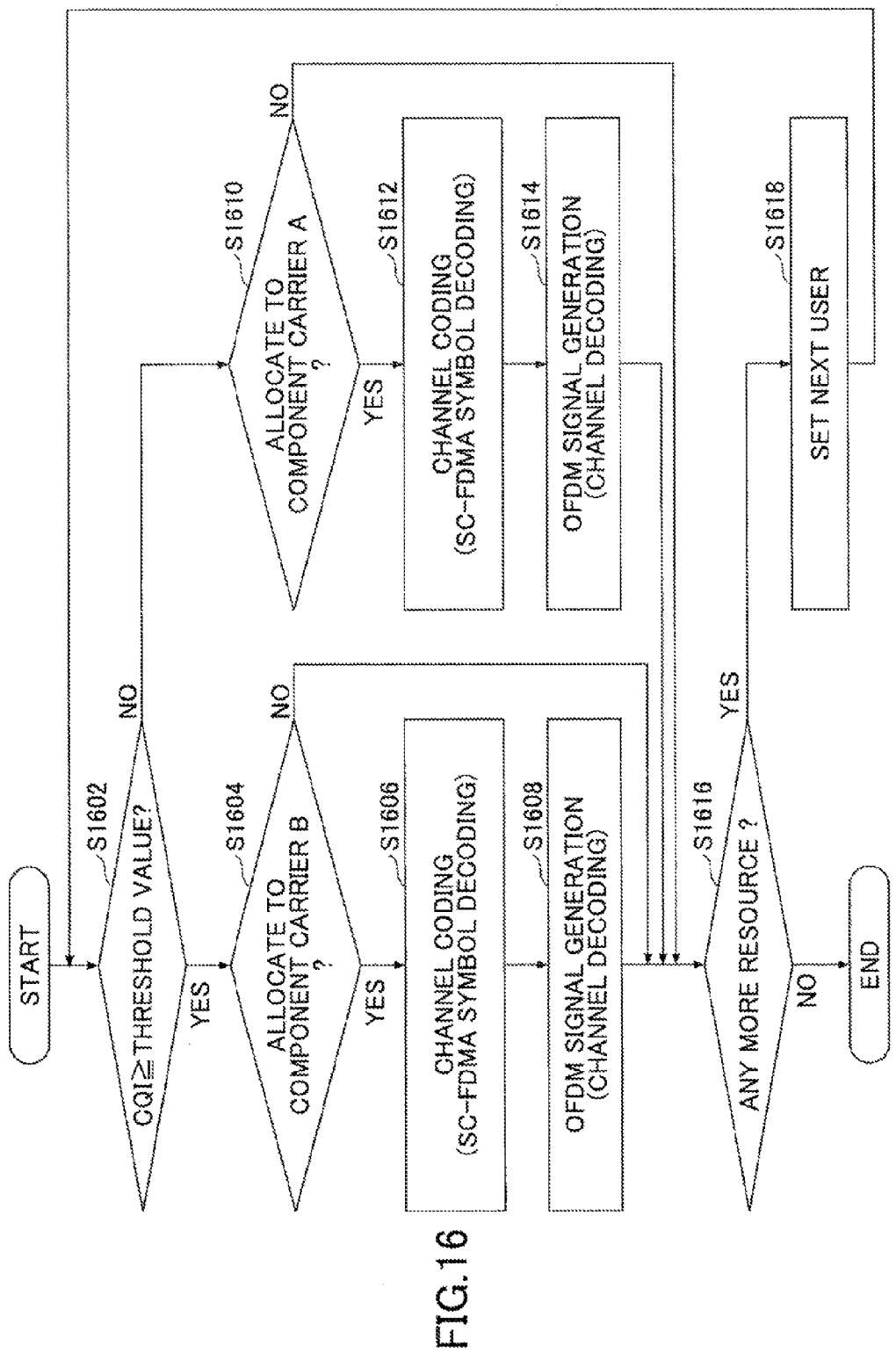
FIG. 16 is an example flowchart illustrating another operation of the radio base station.

FIG. 16 is an example flowchart illustrating operations of radio base station 100.

In the operations of FIG. 16, it is assumed that the radio base station 100 forms (uses) two component carriers A and B. The description below may also be applied to cases where the number of the component carriers is more than two.

The radio terminal 200 measures downlink radio quality. For example, the radio terminal 200 measures the downlink radio quality in the component carriers. The component carries may include 800 MHz band and 2.1 GHz band. As the index of the downlink radio quality, the SIR, the CQI (Channel Quality Indicator), the pathloss or the like may be used.

In the example of FIG. 16, a case is described where the CQI is used as the index indicating the downlink radio quality (see, for example, 3GPP TS36.213 V10.4.0, December 2011).

Upon determining that the CQI from the radio terminal 200 is greater than or equal to a threshold value, the radio base station 100 determining that it is possible to communicate by using the cell B. On the other hand, upon determining that the CQI from the radio terminal 200 is less than the threshold value, the radio base station 100 determining to use the cell A to communicate with the radio terminal 200. This is because the maximum transmission power value of the cell A is greater than that of the cell B.

In step S1602, the component carrier selector 510 determines whether the CQI from the radio terminal 200 is greater than or equal to a threshold value. When determining that the CQI from the radio terminal 200 is greater than or equal to a threshold value, the process goes to step S1604, and otherwise, the process goes to step S1610.

In step S1604, the component carrier selector 510 determines whether to allocate the radio terminal 200 to the component carrier B. When determining to allocate the radio terminal 200 to the component carrier B, the process goes to step S1606, and otherwise, the process goes to step S1616.

In step S1606, the channel encoder $514_2$ maps the downlink signal to the radio terminal 200 to the component carrier B. The downlink signal includes the setting information including the information of the component carrier B. The setting information is sent to the radio terminal 200. Specifically, the setting information is sent to the radio terminal 200 before the radio terminal 200 starts transmitting a radio signal by using the component carrier B.

The channel encoder $514_2$ performs channel coding on the data to be transmitted to the radio terminal 200.

Alternatively, in step S1606, the SC-FDMA decoder $520_2$ may decode SC-FDMA symbols included in an uplink signal from the radio terminal 200.

In step S1608, the OFDM signal generator $516_2$ generates the OFDM signal based on the signal channel-encoded in step S1606.

Alternatively, in step S1608, channel-decoding may be performed on the signal SC-FDMA symbol decoded in step S1606.

In step S1610, the user selector $512_2$ determines whether to allocate the radio terminal 200 to the component carrier A. When determining to allocate the radio terminal 200 to the component carrier A, the process goes to step S1612, and otherwise, the process goes to step S1616.

In step S1612, the channel encoder $514_1$ maps the downlink signal to the radio terminal 200 to the component carrier A. The downlink signal includes the setting information including the information of the component carrier A. The setting information is sent to the radio terminal 200. Specifically, the setting information is sent to the radio terminal 200 before the radio terminal 200 starts transmitting a radio signal by using the component carrier A.

The channel encoder $514_1$ performs channel coding on the data to be transmitted to the radio terminal 200.

Alternatively, in step S1612, the SC-FDMA decoder $520_1$ may decode SC-FDMA symbols included in an uplink signal from the radio terminal 200.

In step S1614, the OFDM signal generator $516_1$ generates the OFDM signal based on the signal channel-encoded in step S1612.

Alternatively, in step S1614, channel-decoding may be performed on the signal SC-FDMA symbol decoded in step S1612.

In step S1616, it is determined whether there is a resource after the OFDM signal is generated in step S1608 or S1614 or after channel-decoding is performed on the SC-FDMA symbol decoded signal.

Alternatively, in step S1616, it is determined whether there is a resource when determining not to allocate the radio terminal 200 to the component carrier in step S1604 or S1610. When determining that there is a resource, the process goes to step S1618.

In step S1618, the next radio terminal is set. Then, the process goes back to step SS1602.

When determining that there is no resource in step S1616, the process ends.

In the flowchart of FIG. 16, the threshold value may be an arbitrary value or a fixed value. Further, a parameter may be used in the threshold value.

Generally, the lower the CQI value becomes, the more degraded the received quality (radio quality) becomes. Therefore, the radio base station 100 performs scheduling so as to preferentially allocate the radio terminal having a higher CQI value to the cell B having a lower maximum transmission power value.

Further, the radio base station 100 performs scheduling so as to preferentially allocate the radio terminal having a lower CQI value to the cell A having a higher maximum transmission power value. By doing this, the higher transmission power value is allocated to the radio terminal having a lower CQI value. Therefore, it is assumed the influence on the transmission power value may be less significant even when the radio terminal is allocated to any of the cells A and B.

Scheduling Method (2)

The scheduler 504 preferentially allocates the radio terminals that may reduce the transmission power value to the cell B having a lower maximum transmission power value. By doing this, it may become possible to allocate more radio terminals to the cell B having the lower maximum transmission power value.

Figure 17:
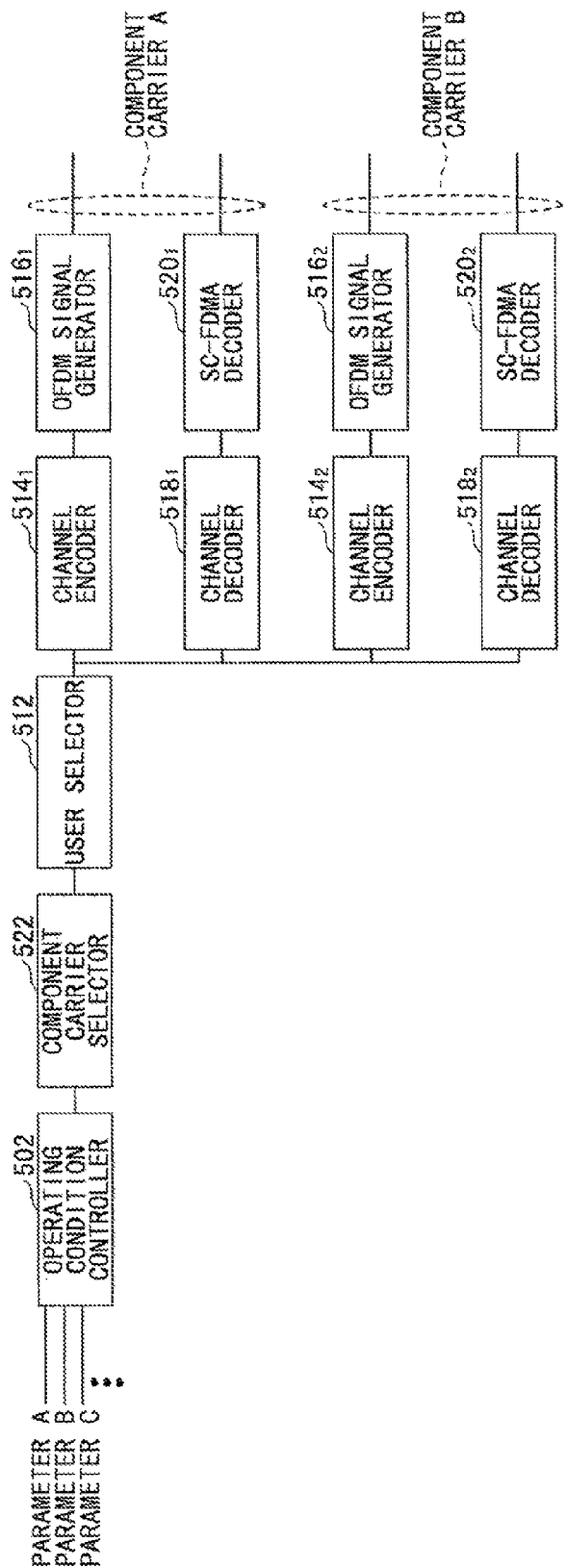
FIG. 17 illustrates another example functional block diagram of the radio base station according to an embodiment.

FIG. 17 illustrates example processes executed by the scheduler 504 (an example functional block diagram of the scheduler 504). For explanatory purposes, FIG. 17 further illustrates the operating condition controller 502 and the like.

Also, for explanatory purposes, FIG. 17 illustrates a case of the LTE. However, it should be noted that the present invention may also be applied to, for example the LTE-Advanced. FIG. 17 illustrates a case where two component carriers are formed (used). However, the number of the component carriers to be formed (used) may be more than two.

The operating condition controller 502 determines whether to switch to the save mode based on parameters A, B, C and the like. Here, the parameters A, B, C, and the like include the above-described traffic information, power resource information, power supply condition information, control information, save energy request information, mode switching information, and the like.

The CPU $108_n$ functions as a component carrier determinator 522. Specifically, it is the CPU $108_{n1}$ that functions as the component carrier determinator 522. The component carrier determinator 522 is connected to the operating condition controller 502. The component carrier determinator 522 determines whether the radio terminal 200 is set as a candidate to communicate using the component carrier A or a candidate to communicate using the component carrier B one by one. The component carrier determinator 522 may determine which one based on, for example, the downlink radio quality.

The component carrier determinator 522 sends the information items to the user selector 512, the information items including the information item indicating the radio terminal selected as the candidate to which the component carrier A is allocated and the information item indicating the radio terminal selected as the candidate to which the component carrier B is allocated.

The CPU $108_n$ functions as a user selector 512. Specifically, it is the CPU $108_{n1}$ that functions as the user selector 512. The user selector 512 is connected to the component carrier determinator 522. The user selector 512 selects the radio terminal to be allocated to the cell A based on the information item from the component carrier determinator 522, the information item indicating the radio terminal selected as the candidate to which the component carrier A is allocated. The user selector 512 sends the information indicating the radio terminal to be allocated to the cell A to the channel encoder $514_1$ and the channel decoder $518_1$.

Further, the user selector 512 selects the radio terminal to be allocated to the cell B based on the information item from the component carrier determinator 522, the information item indicating the radio terminal selected as the candidate to which the component carrier B is allocated. The user selector 512 sends the information indicating the radio terminal to be allocated to the cell B to the channel encoder $514_2$ and the channel decoder $518_2$.

The channel encoder $514_1$, the OFDM signal generator $516_1$, the SC-FDMA decoder $520_1$, and the channel decoder $518_1$ are the same as those described in FIG. 13.

Further, the channel encoder $514_2$, the OFDM signal generator $516_2$, the SC-FDMA decoder $520_2$, and the channel decoder $518_2$ are the same as those described in FIG. 13.

Operation of Radio Base Station 100 (3)

Figure 18:
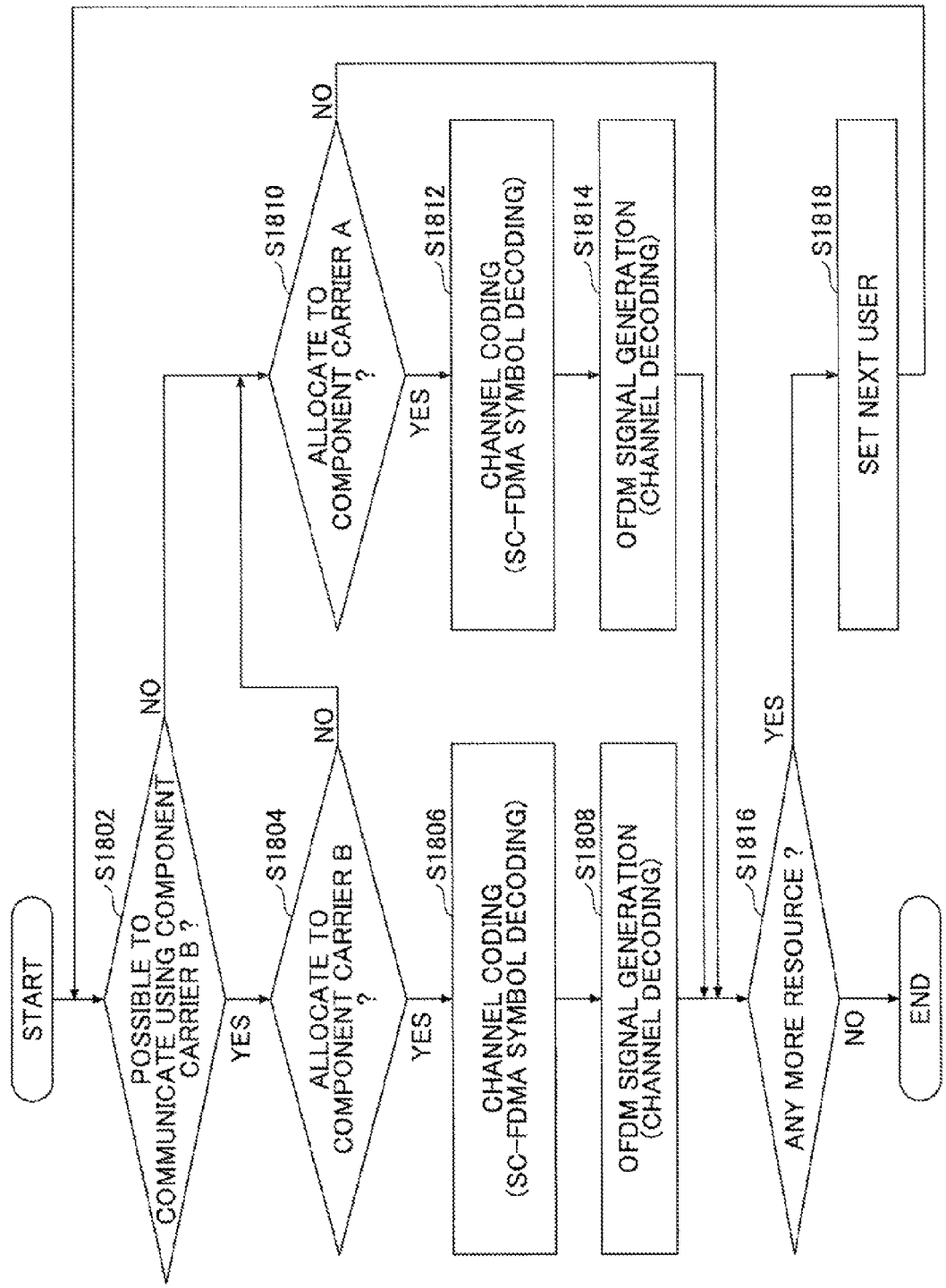
FIG. 18 is an example flowchart illustrating another operation of the radio base station.

FIG. 18 is an example flowchart illustrating operations of radio base station 100.

In the operations of FIG. 18, it is assumed that the radio base station 100 forms (uses) two component carriers.

In step S1802, the component carrier determinator 522 determines whether it is possible for the radio terminal 200 to communicate by using the component carrier B. When determining that it is possible for the radio terminal 200 to communicate by using the component carrier B, the process goes to step S1804, and otherwise, the process goes to step S1810.

In step S1804, the user selector 512 determines whether to allocate the radio terminal 200 to the component carrier B. When determining to allocate the radio terminal 200 to the component carrier B, the process goes to step S1806, and otherwise, the process goes to step S1810.

In step S1806, the channel encoder $514_2$ maps the downlink signal to the radio terminal 200 to the component carrier B. The downlink signal includes the setting information including the information of the component carrier B. The setting information is sent to the radio terminal 200. Specifically, the setting information is sent to the radio terminal 200 before the radio terminal 200 starts transmitting a radio signal by using the component carrier B.

The channel encoder $514_2$ performs channel coding on the data to be transmitted to the radio terminal 200.

Alternatively, in step S1806, the SC-FDMA decoder $520_2$ may decode SC-FDMA symbols included in an uplink signal from the radio terminal 200.

In step S1808, the OFDM signal generator $516_2$ generates the OFDM signal based on the signal channel-encoded in step S1806.

Alternatively, in step S1808, channel-decoding may be performed on the signal SC-FDMA symbol decoded in step S1806.

In step S1810, the user selector 512 determines whether to allocate the radio terminal 200 to the component carrier A. When determining to allocate the radio terminal 200 to the component carrier A, the process goes to step S1812, and otherwise, the process goes to step S1816.

In step S1812, the channel encoder $514_1$ maps the downlink signal to the radio terminal 200 to the component carrier A. The downlink signal includes the setting information including the information of the component carrier A. The setting information is sent to the radio terminal 200. Specifically, the setting information is sent to the radio terminal 200 before the radio terminal 200 starts transmitting a radio signal by using the component carrier A.

The channel encoder $514_1$ performs channel coding on the data to be transmitted to the radio terminal 200.

Alternatively, in step S1812, the SC-FDMA decoder $520_1$ may decode SC-FDMA symbols included in an uplink signal from the radio terminal 200.

In step S1814, the OFDM signal generator $516_1$ generates the OFDM signal based on the signal channel-encoded in step S1812.

Alternatively, in step S1814, channel-decoding may be performed on the signal SC-FDMA symbol decoded in step S1812.

In step S1816, it is determined whether there is a resource after the OFDM signal is generated in step S1808 or S1814 or after channel-decoding is performed on the SC-FDMA symbol decoded signal.

Alternatively, in step S1816, it is determined whether there is a resource when determining not to allocate the radio terminal 200 to the component carrier in step S1810. When determining that there is a resource, the process goes to step S1818.

In step S1818, the next radio terminal is set. Then, the process goes back to step SS1802.

When determining that there is no resource in step S1816, the process ends.

The radio base station 100 may control switching between the operation of FIGS. 15A and 15B (hereinafter referred to as a "first operation flow") and the operation of FIG. 18 (hereinafter referred to as a "second operation flow"). In this case, it is preferable that the same number of the component carriers is used between those operation flows.

Further, the radio base station 100 may control switching between the second flow and the operation of FIG. 16 (hereinafter referred to as a "third operation flow"). In this case, it is preferable that the same number of the component carriers is used between those operation flows.

Which operation flow to be selected to set may be controlled based on a degree of tightness in power supplied to the radio base station 100.

FIG. 19 illustrates an example condition when determining which operation flow is to be selected.

Specifically, in a case of setting the save mode, when a power supply condition is not tight, the operating condition controller 502 controls to operate based on the second operation flow. On the other hand, when the power supply condition is tight, the operating condition controller 502 controls to operate based on first or third operation flow.

This is because when the first or third operation flow is selected rather than the second operation flow, the radio terminal 200 may be more likely to be allocated to the cell having a lower maximum transmission power value. It is assumed that the power consumption in first or third operation flow is less than that in the second operation flow. Therefore, when the power supply condition is tight, the operations are controlled based on first or third operation flow.

The operating condition controller 502 may determine whether the power supply condition is tight by using a threshold power value.

FIG. 20 illustrates an example how to determine whether the power supply condition is tight.

When determining that a calculation result based on the power supplied thereto is less than a predetermined first threshold value "X", the operating condition controller 502 controls to operate based on normal mode.

When determining that the calculation result based on the power supplied thereto is greater than or equal to the predetermined first threshold value "X" and less than a predetermined second threshold value "Y", the operating condition controller 502 controls to operate based on the second operation flow.

Here, the predetermined second threshold value "Y" is greater than or equal to the value "X" (i.e., predetermined first threshold value "X"≤predetermined second threshold value "Y").

When determining that the calculation result based on the power supplied thereto is greater than or equal to the predetermined second threshold value "Y", the operating condition controller 502 controls to operate based on first or third operation flow.

FIG. 20 illustrates the case where the number of threshold values is two. However, only one threshold value or more than two threshold values may be used to determine the operation flow to be set.

Method of Controlling Maximum Transmission Power (1)

The radio base station 100 may control the maximum transmission power value corresponding to the cell that is overlapped with another radio base station by communication with the radio base station.

Figure 21:
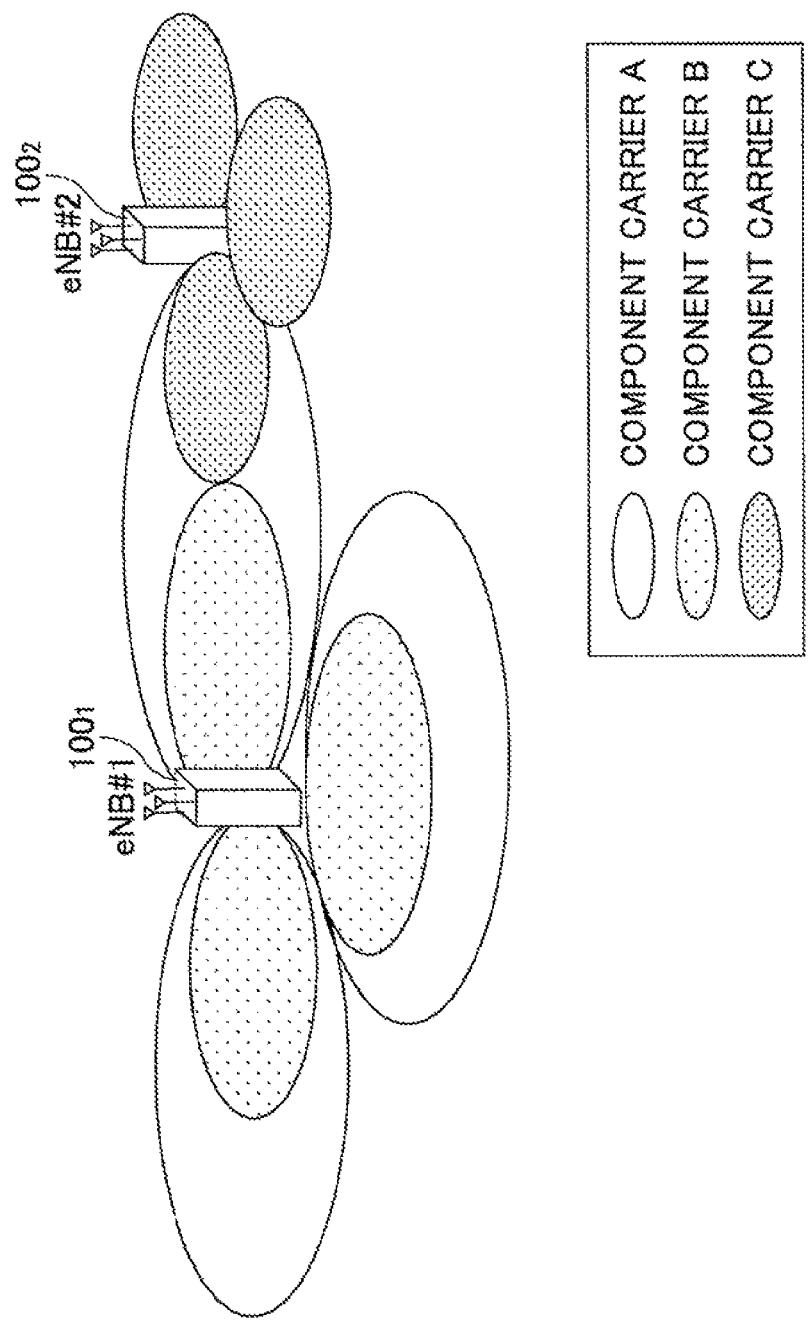
FIG. 21 illustrates an example radio communication system including plural radio base stations according to an embodiment.

FIG. 21 illustrates an example radio communication system including plural radio base stations according to an embodiment.

In the example of FIG. 21, a radio base station $100_1$ performs radio communications by using the component carriers A and B. Further, a radio base station $100_2$ performs radio communications by using the component carrier C. A part of cell A formed by using the component carrier A overlaps the cell C formed by using the component carrier C. In this case, one of the radio base stations $100_1$ and $100_2$ may be set as a master that controls the other radio base station. Further, which of the radio base stations $100_1$ and $100_2$ is to be set as the master may be determined in advance.

Figure 22:
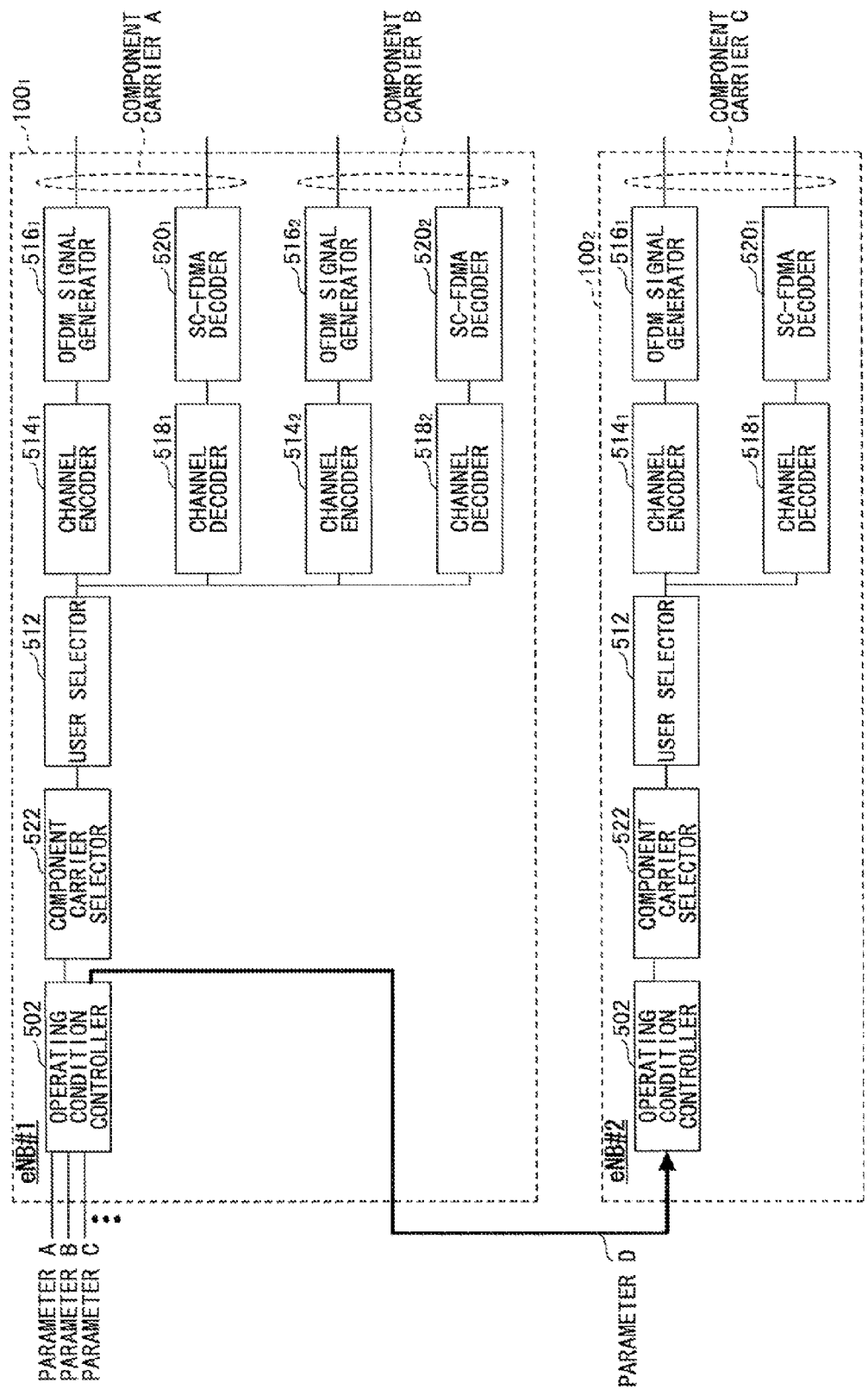
FIG. 22 illustrates another example functional block diagram of the radio base station according to an embodiment.

FIG. 22 illustrates an example configuration (functional block diagram) of the radio base stations 100. FIG. 22 mainly described the scheduler 504.

The radio base station 100 in FIG. 22 differs from the radio base station of FIG. 17 in that, for example, one operating condition controller 502 reports a parameter D to another operating condition controller 502. The parameter D may be reported via a transmission path connecting between radio base stations. The parameter D may include information items indicating whether the component carriers are activated.

The radio base station $100_2$ which is the other base station (other radio base station $100_2$) having received the parameter D from the radio base station $100_1$ which is the one base station (one radio base station $100_1$) controls the maximum transmission power value. Specifically, the operating condition controller 502 of the other radio base station $100_2$ may switch to the save mode. Further, the operating condition controller 502 of the other radio base station $100_2$ may control the resources.

Specifically, the component carrier determinator 522 of the other radio base station $100_2$ controls to prompt the use of another component carrier. Namely, the component carrier determinator 522 of the other radio base station $100_2$ may select a component carrier other than the component carrier C as the candidate of the component carrier to be allocated to the radio terminal 200.

Parameter D

FIG. 23 illustrates example information items of the parameter D.

As illustrated in FIG. 23, the information indicated by the parameter D (information of the parameter D) may be set based on the state of the component carrier A and the state of the component carrier B. Further, in FIG. 23, the value in column of the "energy consumption" increases in proportion to the increase of the energy consumption.

In FIG. 23, when the data of the information of the parameter D indicate "invalid", the component carrier C is set to "ON". On the other hand, when the data of the information of the parameter D indicate "valid", the component carrier C is set to "OFF".

Namely, the radio base station $100_1$ that is set as the master controls the radio base station $100_2$. As described above, the energy consumption may be reduced by setting (switching) ON and OFF the component carrier of the other radio base station $100_2$ based on the control by the radio base station $100_1$ that is set as the master.

The operating condition controller 502 may select a cell operating state in accordance with item numbers from "1" to "8" of FIG. 23 based on the energy consumption. For example, the cell operating state may be set as the candidate to be selected (switched) in the increasing order of the value in the column of the "energy consumption".

FIG. 24 illustrates an example cell operating state changing table to be used to change the cell operation state.

The cell operating state changing table of FIG. 24 is formed by re-arranging (arranging and renumbering) the items (rows) of FIG. 23 in the increasing order of the value in the column of the "energy consumption".

In accordance with a calculation result based on the supplied power, the operating condition controller 502 changes the cell operating state. The calculation result may be the information (value) input to the threshold comparator 718 of FIG. 9. In FIG. 24, parameters A through G are threshold vales having the following relationship:

$$A>B>C>D>E>F>G.$$

Figure 25:
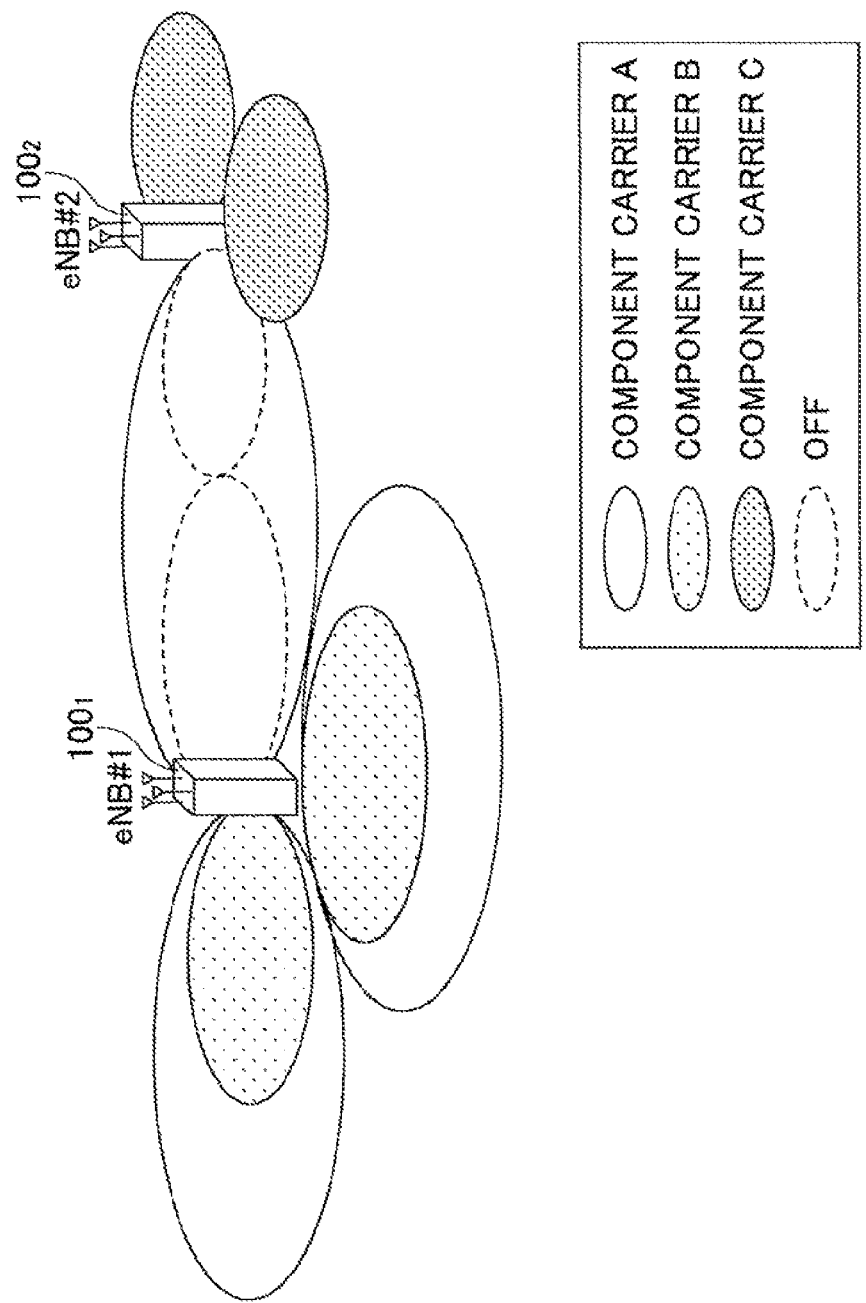
FIG. 25 illustrates example maximum transmission power control of the radio communication system according to an embodiment.

FIG. 25 illustrates an example where the maximum transmission power value is controlled in accordance with the item number "2". In the example of FIG. 25, a part of the cell A formed by using the component carrier A by the radio base station $100_1$ overlaps the cell B formed by using the component carrier B.

Further, a part of one of the plural cells formed by using the component carrier A by the radio base station $100_1$ overlaps one of the plural cells formed by using the component carrier C by the radio base station $100_2$.

In this case, upon switching to the save mode, the operating condition controller 502 of the radio base station $100_1$ controls to stop the power of the one cell of the plural cells formed by the radio base station $100_2$, the one cell being overlapped with the part of the cell formed by the radio base station $100_1$.

Further, upon switching to the save mode, the operating condition controller 502 of the radio base station $100_1$ controls to stop the power of the cell B formed by the radio base station $100_1$, cell B being overlapped with the cell A overlapped with the cell C formed by the radio base station $100_2$.

Namely, the radio base station $100_1$ controls to stop the power of the cell that is overlapped with the cell to be used and that is formed by the radio base station $100_2$. Further, the radio base station $100_1$ controls to stop the power of the cell, that is overlapped with the cell formed by radio base station $100_2$, and that has been controlled by the radio base station $100_1$.

Figure 26:
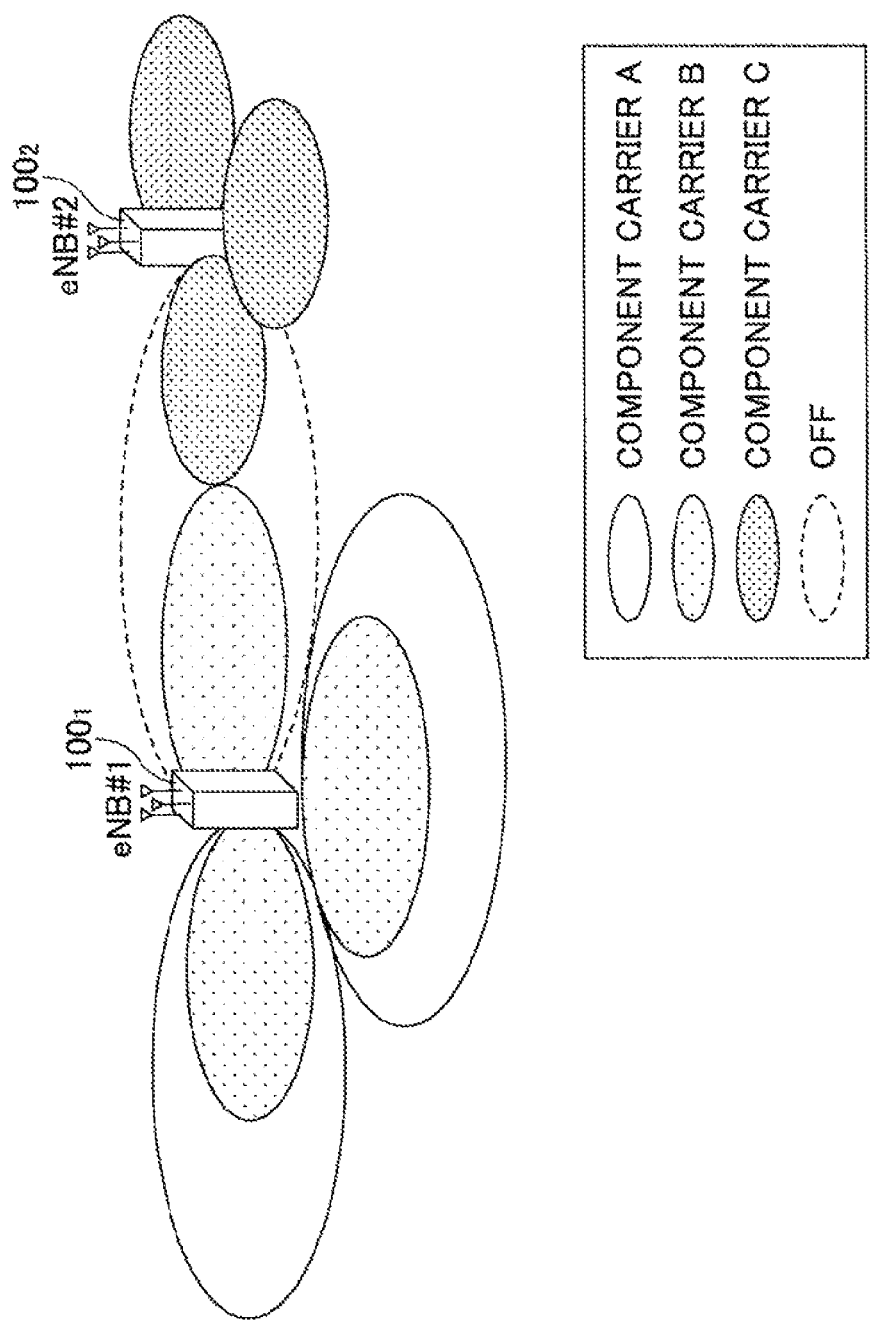
FIG. 26 illustrates another example of the maximum transmission power control of the radio communication system according to an embodiment.

FIG. 26 illustrates an example where the maximum transmission power value is controlled in accordance with the item number "6". The status of the cells in FIG. 26 is substantially the same as that in FIG. 25.

In this case, upon switching to the save mode, if a cell A of the plural cells A formed by the radio base station $100_1$ overlaps with the cell C formed by the radio base station $100_2$, the operating condition controller 502 of the radio base station $100_1$ controls to stop the power of the cell A.

Namely, the operating condition controller 502 of the radio base station $100_1$ stops the power of the cell A overlapping with the cell C formed by the radio base station $100_2$, so that, in the area overlapped with the cell A, the cell B is formed (operated) by the radio base station $100_1$ and the cell C is formed by the radio base station $100_2$.

The above description may also be applied to the case where the maximum transmission power value is controlled in accordance with one of the item numbers "1", "3" through "5", "7", and "8".

The radio base station may control the use of the transmission path connected to the other radio base station to control the maximum transmission power value in the component carrier of the other radio base station. Therefore, the entire energy consumption of the radio communication system may be reduced.

Operation of Radio Communication System (1)

Figure 27:
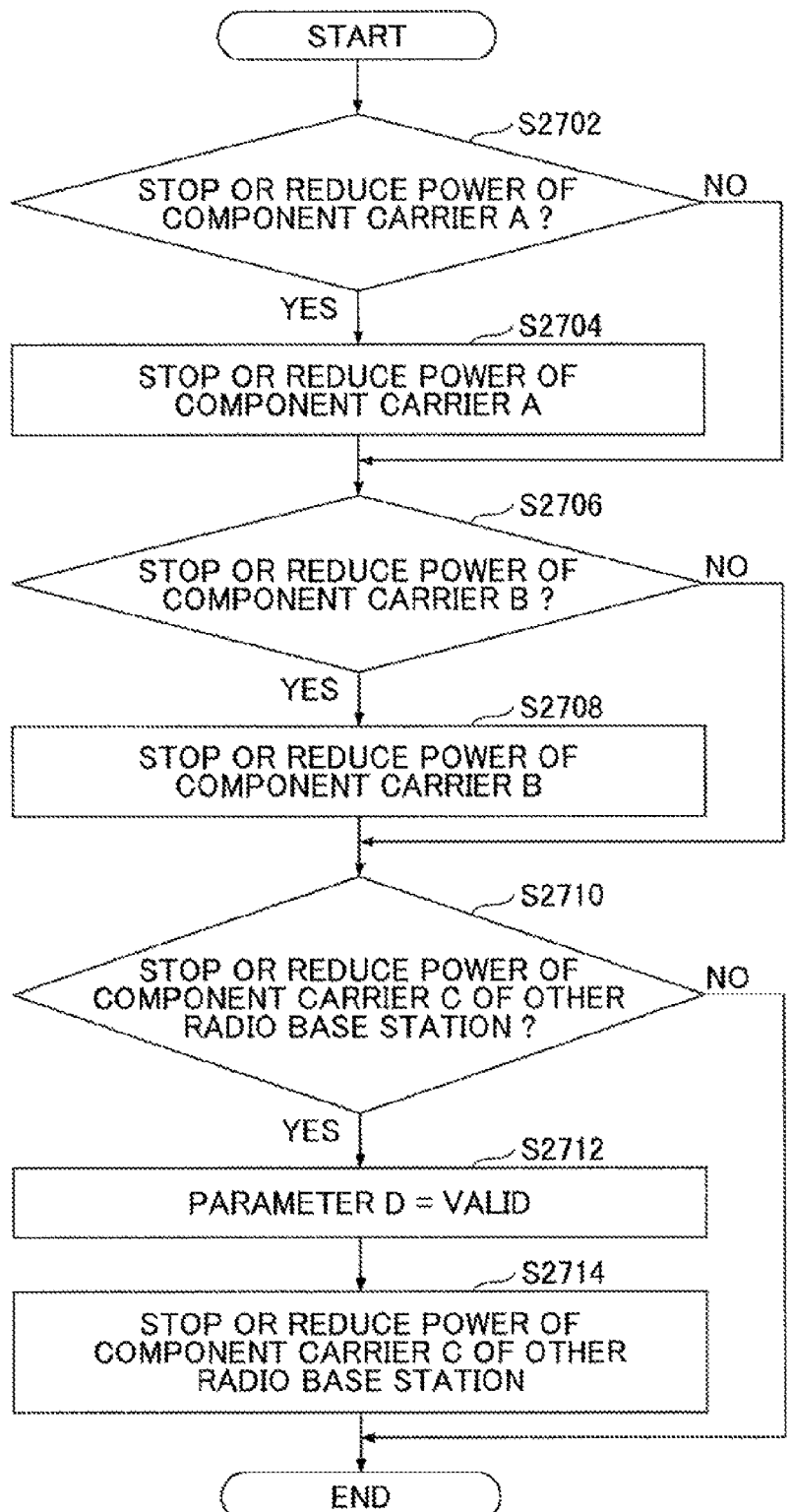
FIG. 27 illustrates an example operation of the radio communication system according to an embodiment.

FIG. 27 is an example flowchart illustrating operations of a radio communication system according to an embodiment.

In step S2702, the operating condition controller 502 of the radio base station $100_1$ determines whether the power of the component carrier A is to be stopped or reduced. When determining that the power of the component carrier A is to be stopped or reduced, the process goes to step S2704. Otherwise, the process goes to step S2706.

In step S2704, the operating condition controller 502 of the radio base station $100_1$ stops or reduces the power of the component carrier A.

In step S2706, the operating condition controller 502 of the radio base station $100_1$ determines whether the power of the component carrier B is to be stopped or reduced. When determining that the power of the component carrier B is to be stopped or reduced, the process goes to step S 2708. Otherwise, the process goes to step S2710.

In step S2708, the operating condition controller 502 of the radio base station $100_1$ stops or reduces the power of the component carrier B.

In step S2710, the operating condition controller 502 of the radio base station $100_1$ determines whether the power of the component carrier C of the other radio base station $100_2$ is to be stopped or reduced. When determining that the power of the component carrier C of the other radio base station $100_2$ is to be stopped or reduced, the process goes to step S 2712.

In step S2712, the operating condition controller 502 of the radio base station $100_1$ sends the parameter D indicating "valid" to the other radio base station $100_2$.

In step S2714, based on the information indicated by the parameter D from the radio base station $100_1$, the operating condition controller 502 of the other radio base station $100_2$ stops or reduces the power of the component carrier C.

In step S2710, when determining that the power of the component carrier C of the other radio base station $100_2$ is not to be stopped or reduced, the process ends.

Method of Controlling Maximum Transmission Power (2)

In the "method of controlling maximum transmission power (1)", the information of the parameter D may be determined depending on the traffic of the radio communication system. In this case, such traffic information may be reported from the radio base station $100_2$ to the radio base station $100_1$.

Figure 28:
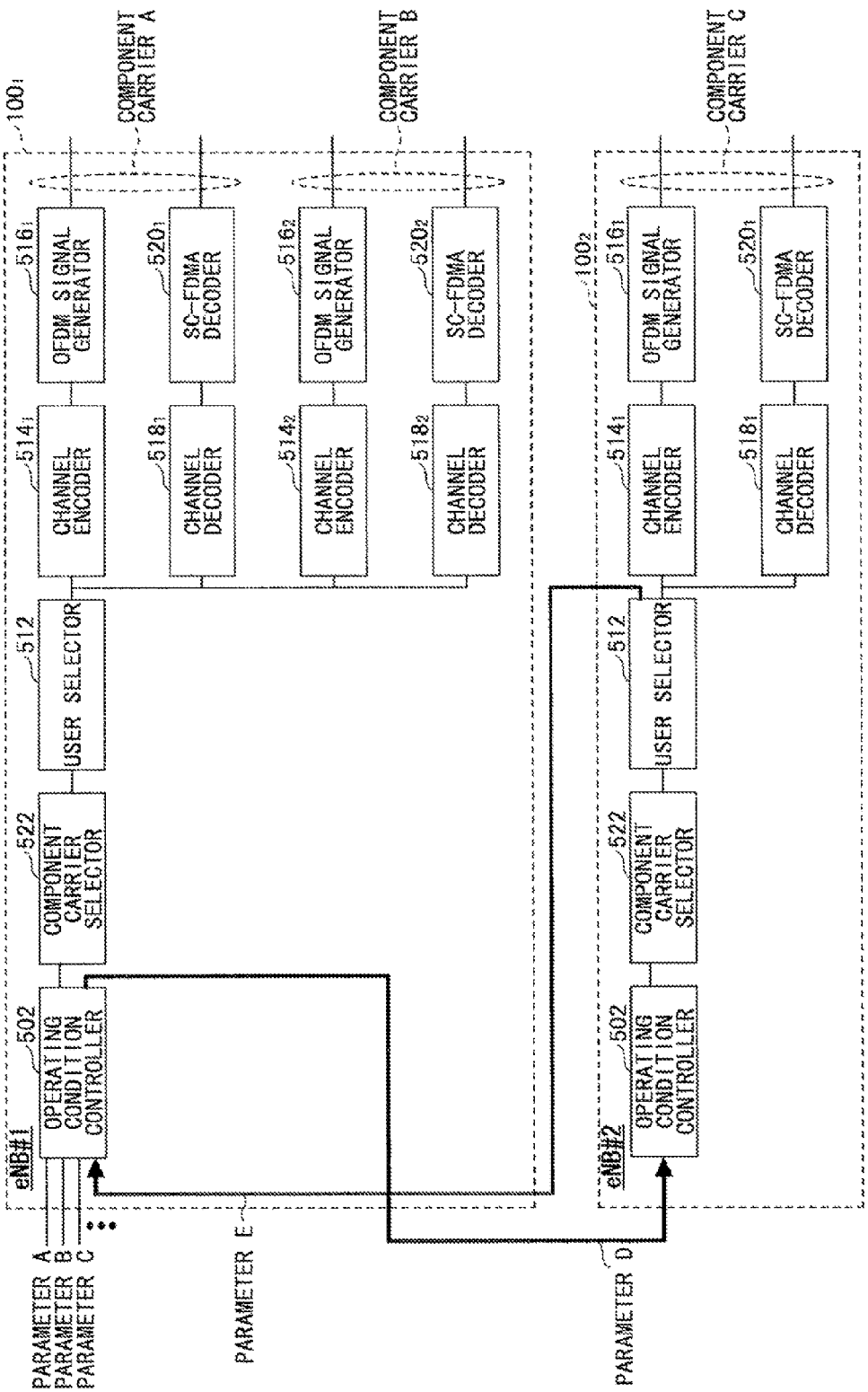
FIG. 28 illustrates another example functional block diagram of the radio base station according to an embodiment.

FIG. 28 illustrates an example of the radio base stations 100 (radio communication system) where the process of reporting the traffic information from the radio base station $100_2$ to the radio base station $100_1$ is added. In FIG. 28, a parameter E is reported from the user selector 512 of the radio base station $100_2$ to the operating condition controller 502 of the radio base station $100_1$.

The parameter E includes the traffic information of the radio base station $100_2$. Based on the traffic (information) of the radio base station $100_1$ and the traffic indicated by the traffic information included in the parameter E, the operating condition controller 502 of the radio base station $100_2$ determines how to control the maximum transmission power value based on the item numbers (rows) in FIG. 23.

FIG. 29 illustrates an example of which of the item numbers in FIG. 23 is to be selected in the control of the maximum transmission power value.

Specifically, FIG. 29 illustrates the correspondence between the cell operating states of the item numbers "2" and "6" in FIG. 23 and the sum of the traffic of the radio base station $100_2$ and the traffic indicated in the traffic information included in the parameter E.

Namely, FIG. 29 illustrate a table indicating which of the cell operating states of the item numbers "2" and "6" in FIG. 23 is to be selected depending on the sum of the traffic of the radio base station $100_2$ and the traffic indicated in the traffic information included in the parameter E. Further, for example, the conditions corresponding to the cell operating states of the item numbers other than the item number"2" and "6" of FIG. 23 may also be set in the table of FIG. 29.

In a case where the sum of the traffic of the radio base station $100_1$ and the traffic indicated in the traffic information included in the parameter E may be handled (accommodated) by (allocated to) the component carrier A, the operating condition controller 502 of the radio base station $100_1$ controls based on the cell operating states of the item number "2" of FIG. 23. Namely, the operating condition controller 502 of the radio base station $100_1$ controls to stop or reduce the component carriers B and C. In this case, the component carrier A is used.

In a case where the sum of the traffic of the radio base station $100_1$ and the traffic indicated in the traffic information included in the parameter E may not be handled (accommodated) by the component carrier A, the operating condition controller 502 of the radio base station $100_1$ controls based on the cell operating states of the item number "6" of FIG. 23. Namely, the operating condition controller 502 of the radio base station $100_1$ controls to stop or reduce the component carrier A. In this case, the component carriers B and C are used.

Operation of Radio Communication System (2)

Figure 30:
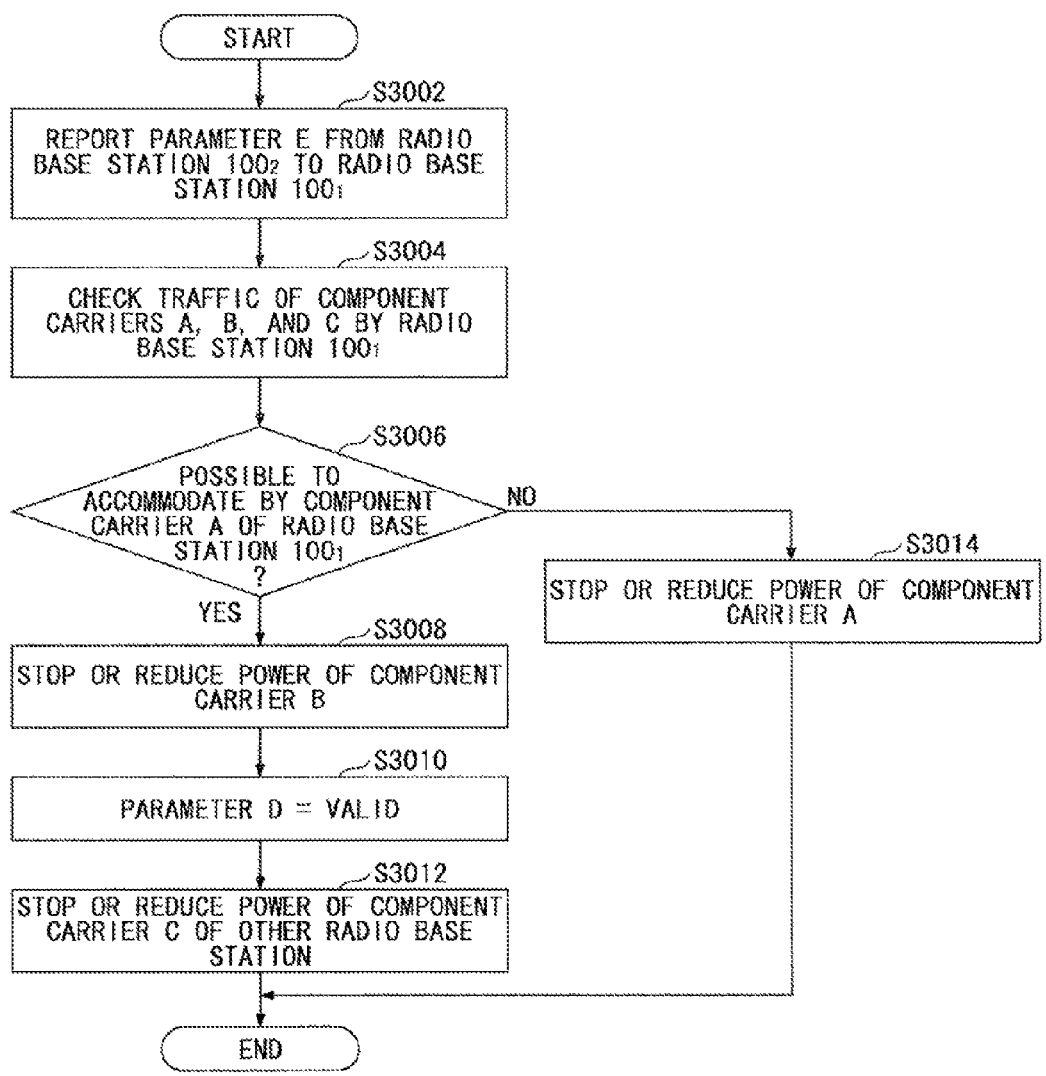
FIG. 30 is an example flowchart illustrating another operation of the radio communication system according to an embodiment.

FIG. 30 is an example flowchart illustrating operations of a radio communication system according to an embodiment.

In step S3002, the user selector 512 of the radio base station 100₂ reports the parameter E to the operating condition controller 502 of the radio base station 100₁. In this case, the user selector 512 of the radio base station 100₂ may periodically or irregularly reports the parameter E.

In step S3004, the operating condition controller 502 of the radio base station 100₁ checks (measures) the traffic (data) of the component carriers A, B, and C.

In step S3006, the operating condition controller 502 of the radio base station 100₁ determines whether the sum of the traffic data of the component carriers A, B, and C may be handled (accommodated) by the component carrier A. When determining that the sum of the traffic data of the component carriers A, B, and C may be handled (accommodated) by the component carrier A, the process goes to step S3008, and otherwise, the process goes to step S3014.

In step S3008, the operating condition controller 502 of the radio base station 100₁ controls to stop or reduce the power of the component carrier B.

In step S3010, the operating condition controller 502 of the radio base station 100₁ reports the parameter D to the radio base station 100₂, the parameter D including the information instructing to stop or reduce the power of the component carrier C. Further, the parameter D includes the information indicating "valid".

In step S3012, based on the information indicated in the parameter D from the radio base station 100₁, the operating condition controller 502 of the radio base station 100₂ stops or reduces the power of the component carrier C.

In step S3014, the operating condition controller 502 of the radio base station 100₁ stops and reduces the power of the component carrier A.

By doing this, it may be possible to optimize the cell operating states of the entire radio communication system.

Method of Controlling Maximum Transmission Power (3)

Figure 31:
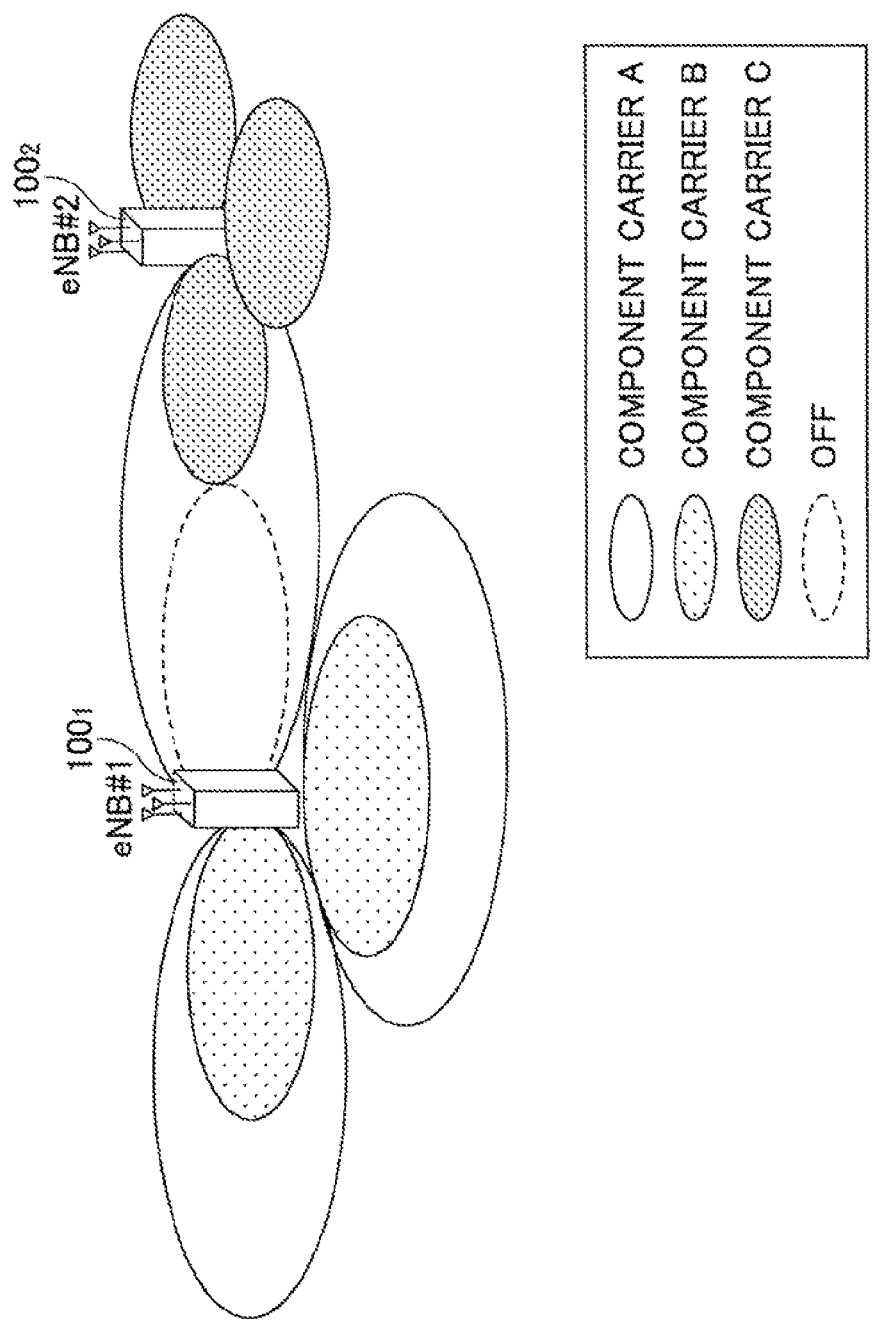
FIG. 31 illustrates another example radio communication system including plural radio base stations according to an embodiment.

FIG. 31 illustrates an example radio communication system including plural radio base stations according to an embodiment.

In a case where the traffic of the radio base station 100₂ is biased, it is assumed that the component carrier C may not handle (accommodate) all the radio terminals. In this case, the radio base station 100₁ controls to stop the power of the component carrier B. Namely, the radio base station 100₁ accommodates the traffic of the radio base station 100₂ by using the component carrier A and causes the continued use of the component carrier C.

Operation of Radio Communication System (3)

Figure 32:
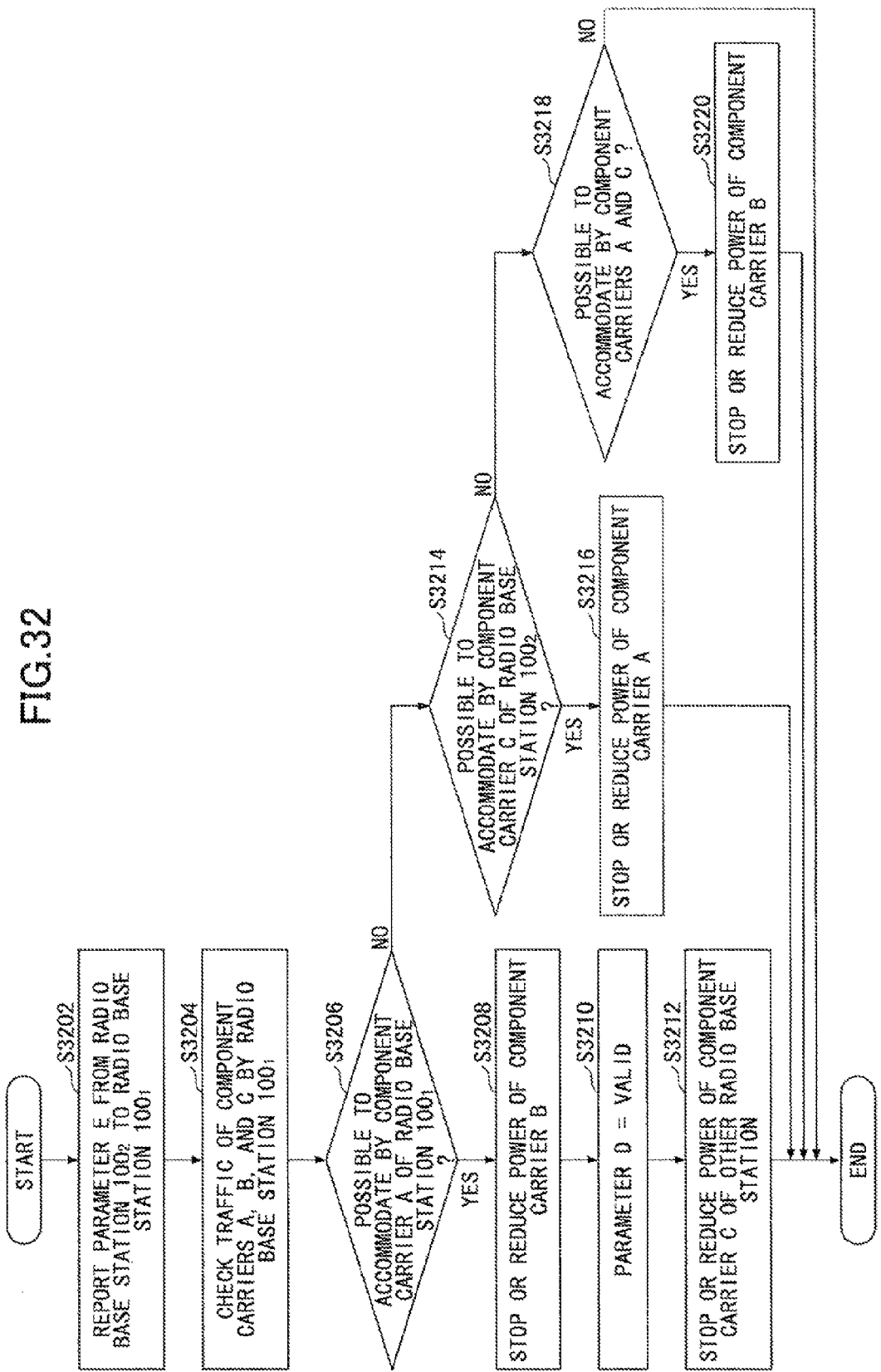
FIG. 32 is an example flowchart illustrating another operation of the radio communication system according to an embodiment.

FIG. 32 is an example flowchart illustrating operations of a radio communication system according to an embodiment.

Steps S3202 through S3212 of FIG. 32 are similar to steps S3002 through S3012, respectively, of FIG. 30.

In step S3206, when determining that the sum of the traffic data of the component carriers A, B, and C may not be handled (accommodated) by the component carrier A, the process goes to step S3214.

In step S3214, the operating condition controller 502 of the radio base station 100₁ determines whether the sum of the traffic data of the component carriers A, B, and C may be handled (accommodated) by the component carrier C.

When determining that the sum of the traffic data of the component carriers A, B, and C may be handled (accommodated) by the component carrier C, the process goes to step S3216, and otherwise, the process goes to step S 3218.

In step S3216, the operating condition controller 502 of the radio base station 100₁ stops or reduces the component carrier A.

In step S3218, the operating condition controller 502 of the radio base station 100₁ determines whether the sum of the traffic data of the component carriers A, B, and C may be handled (accommodated) by the component carriers A and C.

When determining that the sum of the traffic data of the component carriers A, B, and C may be handled (accommodated) by the component carriers A and C, the process goes to step S3220.

In step S3220, the operating condition controller 502 of the radio base station 100₁ stops or reduces the component carrier B.

On the other hand, when determining that the sum of the traffic data of the component carriers A, B, and C may not be handled (accommodated) by the component carriers A and C, the process ends.

Operation of Radio Communication System (4)

When the maximum transmission power value is controlled in accordance with the "Operation of radio communication system (3)", there may be a case where the traffic changes rapidly. Specifically, when the traffic amount is increased, there may be a case where a call loss occurs. Therefore, the radio base station 100 stops the power of the component carrier when the traffic amount occasionally increases or decreases.

More specifically, the radio base station 100 acquires statistical information of the traffic amount, so that the radio base station 100 may determine whether the current traffic is in an increasing trend or a decreasing trend based on the statistical information.

Operation of Radio Communication System (4)

Figure 33:
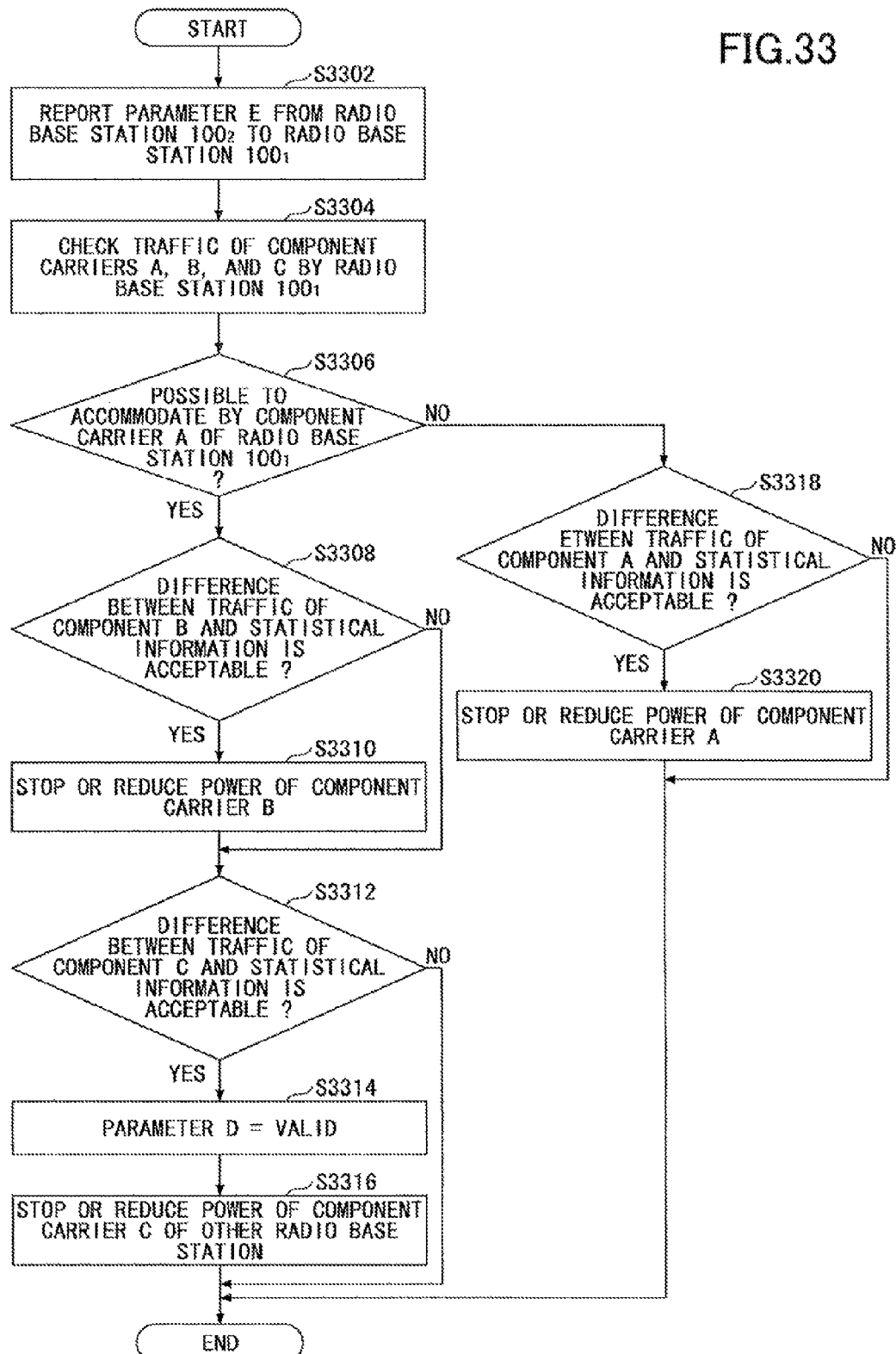
FIG. 33 is an example flowchart illustrating another operation of the radio communication system according to an embodiment.

FIG. 33 is an example flowchart illustrating operations of a radio communication system according to an embodiment.

Steps S3302 through S3306 of FIG. 33 are similar to steps S3002 through S3006, respectively, of FIG. 30.

In step S3306, when determining that the sum of the traffic data of the component carriers A, B, and C may be handled (accommodated) by the component carrier A, the process goes to step S3308, and otherwise, the process goes to step S3318.

In step S3308, the operating condition controller 502 of the radio base station 100₁ determines whether a difference between the traffic of the component carrier B and the statistical information is acceptable.

When determining that the difference is acceptable, the process goes to step S3310, otherwise, the process goes to step S3312.

In step S3310, the operating condition controller 502 of the radio base station 100₁ stops or reduces the power of the component carrier B. Then, the process goes to step S3312.

In step S3312, the operating condition controller 502 of the radio base station 100₁ determines whether a difference between the traffic of the component carrier C and the statistical information is acceptable.

When determining that the difference is acceptable, the process goes to step S3314.

In step S3314, the operating condition controller 502 of the radio base station 100₁ reports the parameter D to the radio base station 100₁, the parameter D including the information indicating to stop or reduce the power of the component carrier C. The parameter D further includes the information indicating "valid".

In step S3316, based on the information indicated in the parameter D from the radio base station 100₁, the operating condition controller 502 of the radio base station 100₂ stops and reduces the power of the component carrier C.

In step S3318, the operating condition controller 502 of the radio base station 100₁ determines whether a difference between the traffic of the component carrier A and the statistical information is acceptable.

When determining that the difference is acceptable, the process goes to step S3320.

In step S3320, the operating condition controller 502 of the radio base station 100₁ stops or reduces the power of the component carrier A.

When determining that the difference between the traffic of the component carrier C and the statistical information is not acceptable in step S3312 or when determining that the difference between the traffic of the component carrier A and the statistical information is not acceptable in step S3318, the process ends.

Operation of Radio Communication System (5)

For example, when the maximum transmission power value is controlled based on the cell operating state of the item number "2" of FIG. 23, there may be a case where the communications may be cut with a radio terminal located in an area of the component carrier where the power thereto is stopped or reduced.

To avoid such communication cut, the following process is executed before stopping or reducing the power to the component carrier C of the radio base station 100₂. Namely, the radio terminal is handed over from the component carrier C of the radio base station 100₂ to the component carrier A or B of the radio base station 100₁.

Figure 34:
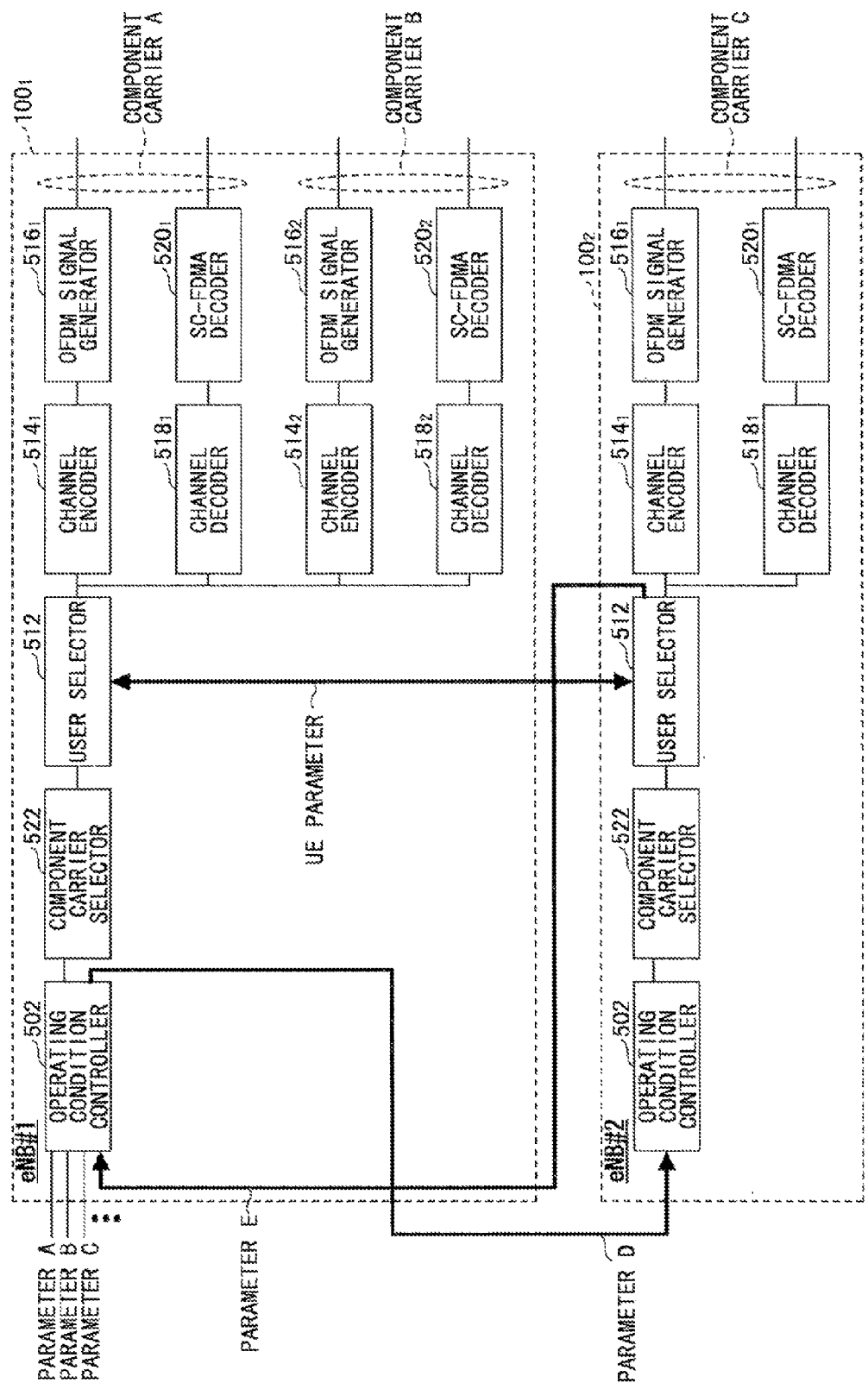
FIG. 34 illustrates another example functional block diagram of the radio base station according to an embodiment.

FIG. 34 illustrates an example of a radio base station 100 according to an embodiment. In the base station 100 of FIG. 34, the user selector 512 of the radio base station 100₁ is in communication with the user selector 512 of the radio base station 100₂, and a "UE parameter" is transmitted and received between the user selectors 512.

The UE parameter is a control signal to request the handover (operation) between the component carrier of the radio base station 100₂ and the component carrier of the radio base station 100₁. The UE parameter may be a control message.

Specifically, when the control of the maximum transmission power value is controlled based on the cell operating state of the item number "2" of FIG. 23, the user selector 512 of the radio base station 100₂ reports the UE parameter to the user selector 512 of the radio base station 100₁ to handover the radio terminal located in the area of the component carrier C.

Based on the parameter UE reported from the radio base station 100₂, the user selector 512 of the radio base station 100₁ causes the radio terminal located in the area of the component carrier C of the radio base station 100₂ to handover to the component carrier A. The handover is described in, for example, 3GPP TS36.300 V11.0.0, December 2011.

Further, a control signal or a control message triggered by the handover may be transmitted from another device, software/hardware installed/mounted in a device, or the radio terminal. Further, to cause the radio terminal to request the handover, the radio base station may transmit broadcast information or may separately transmit the information to the radio terminals before sending the request.

Operation of Radio Communication System (5)

Figure 35:
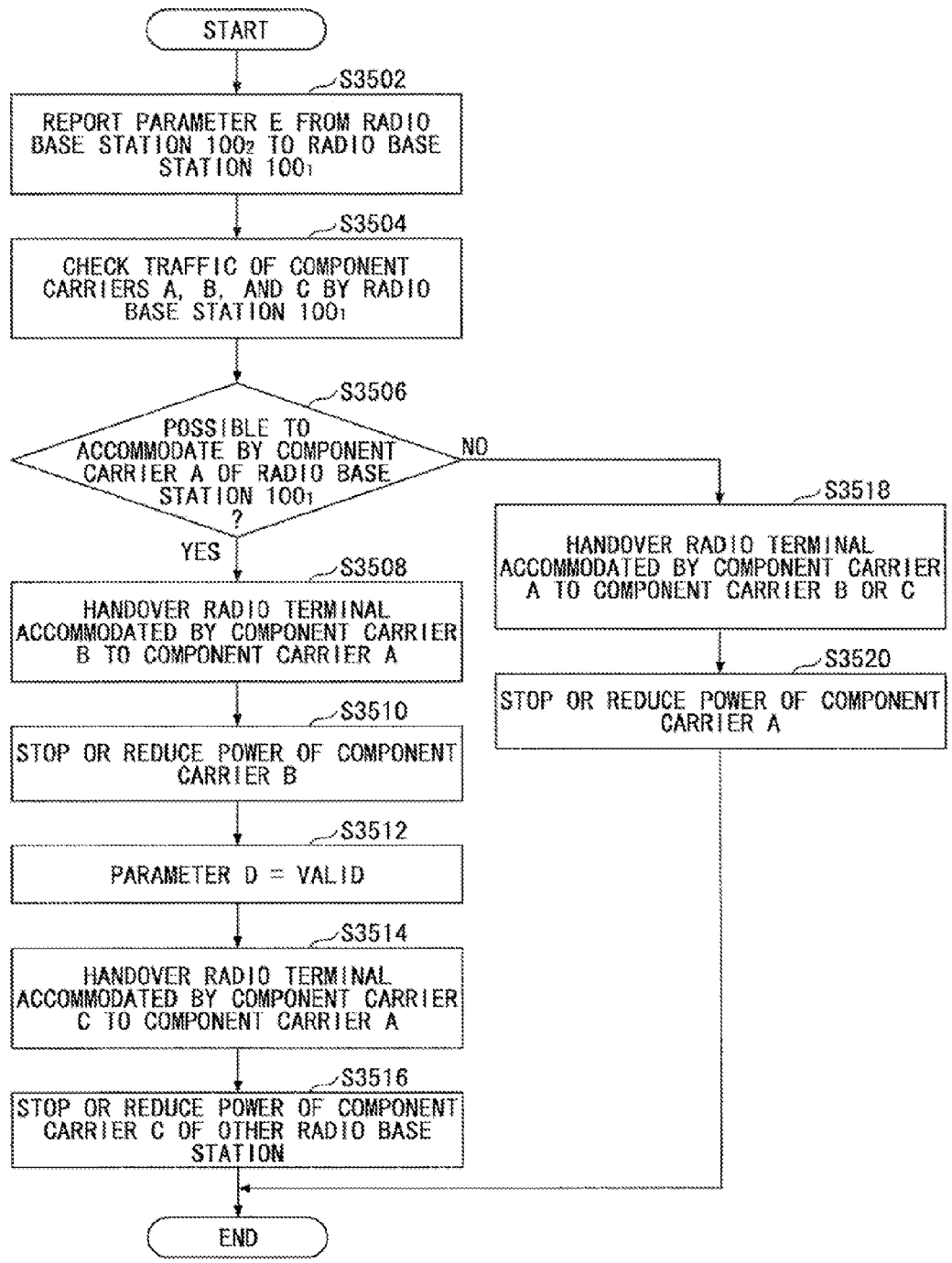
FIG. 35 is an example flowchart illustrating another operation of the radio communication system according to an embodiment.

FIG. 35 is an example flowchart illustrating operations of a radio communication system according to an embodiment.

In step S3502, the user selector 512 of the radio base station 100₂ reports the parameter E to the operating condition controller 502 of the radio base station 100₁. In this case, the user selector 512 of the radio base station 100₂ may periodically or irregularly reports the parameter E.

In step S3504, the operating condition controller 502 of the radio base station 100₁ checks (measures) the traffic of the component carriers A, B, and C.

In step S3506, the operating condition controller 502 of the radio base station 100₁ determines whether the sum of the traffic of the component carriers A, B, and C may be handled (accommodated) by the component carrier A. When determining that the sum of the traffic data of the component carriers A, B, and C may be handled (accommodated) by the component carrier A, the process goes to step S3508, and otherwise, the process goes to step S3518.

In step S3508, the operating condition controller 502 of the radio base station 100₁ causes the radio terminal handled (accommodated) by the component carrier B to handover to the component carrier A.

In step S3510, the operating condition controller 502 of the radio base station 100₁ controls to stop or reduce the power of the component carrier B.

In step S3512, the operating condition controller 502 of the radio base station 100₁ reports the parameter D to the radio base station 100₂, the parameter D including the information instructing to stop or reduce the power of the component carrier C. Further, the parameter D includes the information indicating "valid".

In step S3514, the operating condition controller 502 of the radio base station 100₁ hands over the radio terminals handled (accommodated) by the component carrier C to the component carrier A. Upon the report of the parameter D including the information indicating "valid" from the radio base station 100₁, the operating condition controller 502 of the radio base station 100₂ reports the UE parameter to the radio base station 100₁.

Based on the UE parameter from the radio base station 100₂, the user selector 512 of the radio base station 100₁ causes the radio terminals handled (accommodated) by the component carrier C to handover to the component carrier A.

In step S3516, based on the information indicated by the parameter D from the radio base station 100₁, the operating condition controller 502 of the radio base station 100₂ stops or reduces the power of the component carrier C.

On the other hand, in step S3518, the user selector 512 of the radio base station 100₁ controls to cause the radio terminals handled (accommodated) by the component carrier A to handover to the component carrier B or C.

Upon controlling to cause the radio terminals handled (accommodated) by the component carrier A to handover to the component carrier C, the user selector 512 of the radio base station 100₁ reports the UE parameter to the radio base station 100₂. Based on the UE parameter from the radio base station 100₁, the user selector 512 of the radio base station 100₂ causes the radio terminals handled (accommodated) by the component carrier A to handover to the component carrier C.

Further, the user selector 512 of the radio base station 100₁ controls to cause the radio terminals handled (accommodated) by the component carrier A to handover to the component carrier B.

In step S3520, the operating condition controller 502 of the radio base station 100₁ stops and reduces the power of the component carrier A.

Further, upon stopping or reducing the power of the component carrier of the other radio base station, new connections with the radio terminal may be preferentially controlled rather than the control of stopping or reducing the power of the other radio base station.

Specifically, the other radio base station may transmit broadcast information including information items indicating a cell, adjacent to a cell where the power thereof is stopped or reduced, where the maximum transmission power value thereof is not controlled.

Then, it is assumed that the radio terminal having received the broadcast information may be controlled so as not to connect to the cell of the other radio base station where the power thereof is stopped or reduced.

Otherwise, for example, to prevent the radio base station from newly registering a radio terminal, the broadcast information may be reported to the radio terminals from an upper node.

Operation of Radio Communication System (6)

Figure 36:
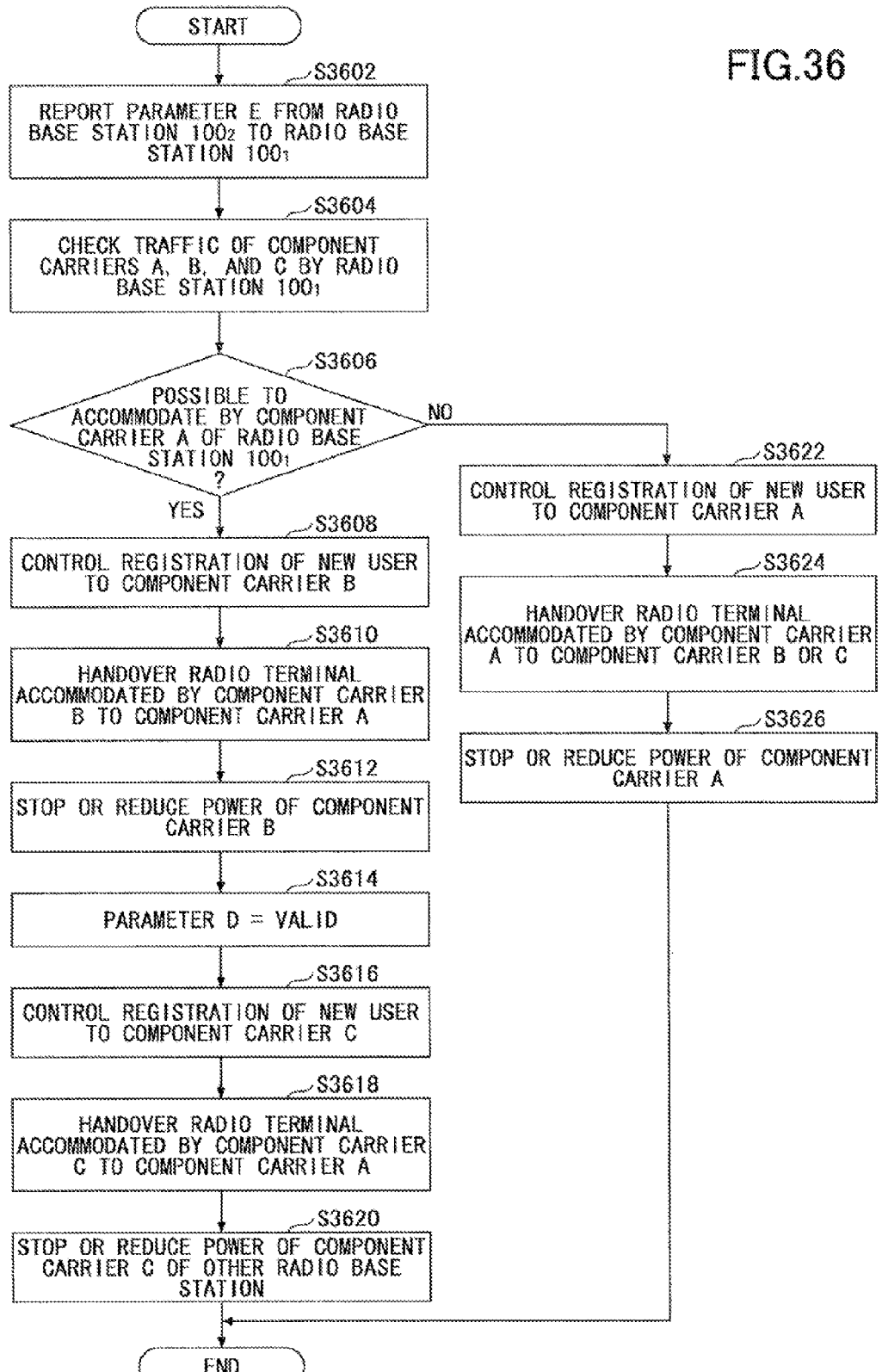
FIG. 36 is an example flowchart illustrating another operation of the radio communication system according to an embodiment.

FIG. 36 is an example flowchart illustrating operations of a radio communication system according to an embodiment.

Steps S3602 through S3606 of FIG. 36 are similar to steps S3002 through S3006, respectively, of FIG. 30.

In step S3606, when determining that the sum of the traffic data of the component carriers A, B, and C may be handled (accommodated) by the component carrier A, the process goes to step S3608, and otherwise, the process goes to step S3622.

In step S3608, the user selector 512 of the radio base station $100_1$ controls the registration of a radio terminal to the component carrier B.

In step S3610, the user selector 512 of the radio base station $100_1$ causes the radio terminal handled (accommodated) by the component carrier B to handover to the component carrier A.

In step S3612, the operating condition controller 502 of the radio base station $100_1$ controls to stop or reduce the power of the component carrier B.

In step S3614, the operating condition controller 502 of the radio base station $100_1$ sends the parameter D to the radio base station $100_2$. The parameter D includes the information item instructing to stop or reduce the power of the component carrier. Further, the parameter D further includes the information item indicating the "valid".

In step S3616, the user selector 512 of the radio base station $100_1$ controls the registration of a radio station to the component carrier C.

In step S3618, the user selector 512 of the radio base station $100_1$ causes the radio terminal handled (accommodated) by the component carrier C to handover to the component carrier A.

In step S3620, the operating condition controller 502 of the radio base station $100_2$ controls to stop or reduce the power of the component carrier C.

In step S3622, the user selector 512 of the radio base station $100_1$ controls the registration of a radio terminal to the component carrier A.

In step S3624, the user selector 512 of the radio base station $100_1$ causes the radio terminal handled (accommodated) by the component carrier A to handover to the component carrier B. Further, the user selector 512 of the radio base station $100_1$ causes the radio terminal handled (accommodated) by the component carrier A to handover to the component carrier C.

In step S3626, the operating condition controller 502 of the radio base station $100_1$ controls to stop or reduce the power of the component carrier A.

In the above embodiment, the operating condition controller 502 may select the cell operating state based on the energy consumption and the traffic information.

Specifically, the operating condition controller 502 may acquire a candidate of the cell operating state based on a calculation result using the supplied power. As the calculation result, the information to be input to the threshold comparator 718 of FIG. 9 may be used.

FIG. 37 illustrates an example cell operating state candidate selection table that may be used for selecting the candidate of the cell operating state.

In the cell operating state candidate selection table of FIG. 37, the data arranged using item numbers in FIG. 23 are re-arranged in the increasing order of the energy consumption. In FIG. 37, the symbols A though G denote respective threshold values satisfying A>B>C>D>E>F>G.

For example, when the calculation result "N" is given as C<N≤B, the operating condition controller 502 determines that the cell operating states of the item numbers "3" through "8" are to be set as the candidates in switching to the save mode. Further, for example, when the calculation result "N" is given as E<N≤D, the operating condition controller 502 determines that the cell operating states of the item numbers "5" through "8" are to be set as the candidates in switching to the save mode.

The operating condition controller 502 of the radio base station $100_1$ sets the cell operating state to be used from among the candidates based on the traffic information from the radio base station $100_2$.

Operation of Radio Communication System (7)

FIGS. 38A and 38B are an example flowchart illustrating operations of a radio communication system according to an embodiment.

The radio base stations $100_1$ and the $100_2$ perform process according to the above embodiment.

Steps S3802 through S3806 of FIG. 38A are similar to steps S3002 through S3006, respectively, of FIG. 30. Step S3808 of FIG. 38A is similar to step S3308 of FIG. 33. Steps S3810 through S3814 of FIG. 38B are similar to steps S3608 through S3612, respectively, of FIG. 36. Step S3816 is similar to step S3312 of FIG. 33.

Steps S3818 through S3822 of FIG. 38B are similar to steps S3616 through S3620, respectively, of FIG. 36. Step S3824 is similar to step S3214 of FIG. 32. Step S3826 is similar to step S3318 of FIG. 33. Steps S3828 through S3832 of FIG. 38B are similar to steps S3622 through S3626, respectively, of FIG. 36.

In step S3824, when determining that the sum of the traffic data of the component carriers A, B, and C may not be handled (accommodated) by the component carrier C, the process goes to step S3834.

In step S3834, the operating condition controller 502 of the radio base station $100_1$ determines whether the sum of the traffic data of the component carriers A, B, and C may be handled (accommodated) by both of the component carriers A and C.

When determining that the sum of the traffic data of the component carriers A, B, and C may be handled (accommodated) by both of the component carriers A and C, the process goes to step S3836.

In step S3836, the operating condition controller 502 of the radio base station $100_1$ determines whether a difference between the traffic of the component carrier B and the statistical information is acceptable.

When determining that the difference between the traffic of the component carrier B and the statistical information is acceptable, the process goes to step S3838.

In step S3838, the user selector 512 of the radio base station $100_1$ controls the registration of a radio terminal to the component carrier B.

In step S3840, the user selector 512 of the radio base station 100₁ causes the radio terminal handled (accommodated) by the component carrier B to handover to the component carrier A.

In step S3842, the operating condition controller 502 of the radio base station 100₁ controls to stop or reduce the power of the component carrier B.

In step S3834, when determining that the sum of the traffic data of the component carriers A, B, and C may not be handled (accommodated) by using both of the component carriers A and C, the process ends.

In step S3636, when determining that the difference between the traffic of the component carrier B and the statistical information is not acceptable, the process ends.

According to an embodiment, when a service is provided by using plural component carriers such as in the carrier aggregation, it may become possible to reduce energy consumption.

Specifically, in accordance with the instructions between radio base stations or from an upper node, a radio base station may switch to the save mode. In the save mode, a control is performed to reduce the maximum transmission power value of a predetermined carrier component.

Further, in the save mode, the scheduling is executed to increase the number of radio terminals to use the component carrier having the lowest lower limit value of the dynamic range. Specifically, the scheduling is executed so that the allocation rate to allocate the radio terminals to the component carrier having the lowest lower limit value of the dynamic range may be increased.

By increasing the allocation rate to allocate the radio terminals to the component carrier having the lowest lower limit value of the dynamic range, the peak energy consumption (peak power) of the entire radio communication system may be reduced.

Further, in an environment where there are plural cells using the component carriers, a radio base station may switch to the save mode based on the instructions between the radio base stations or from the upper node. In the save mode, the use of the component carrier may be stopped or the power of the component carrier may be reduced.

Further, the number of radio terminals to be allocated to the component carrier where the power thereof is reduced may be increased. By increasing the number of radio terminals allocated to the component carrier where the power thereof is reduced, the peak energy consumption (peak power) of the entire radio communication system may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it is to be understood that various changes, substitutions, and alterations could be made hereto without departing from the spirit and scope of the invention.

What is claimed is:

1. A radio base station providing a service to a radio terminal by using plural component carriers, the radio base station comprising:
   a scheduler configured to preferentially allocate, to the radio terminal, one of the component carriers that has a transmission power dynamic range that is defined by an upper limit value and a lower limit value and the lower limit value of which is lower than lower limit values of transmission power dynamic ranges of a rest of the component carriers; and
   a transmitter configured to transmit a radio signal to the radio terminal by using the allocated component carrier.

2. The radio base station as claimed in claim 1, further comprising:
   a setting information transmitter configured to transmit setting information to the radio terminal before transmission of the radio signal using the allocated component carrier is started, wherein the setting information includes information indicating the allocated component carrier.

3. The radio base station as claimed in claim 1, further comprising:
   an operation state determinator configured to set the radio base station to one of a first operating state and a second operating state, wherein the first operating state indicates where lower limit values of the transmission power dynamic ranges of the plural component carriers are set to be substantially equal to each other, and wherein the second operating state indicates where lower limit values of the transmission power dynamic ranges of some of the plural component carriers are set to be lower than lower limit values of the transmission power dynamic ranges of a rest of the component carriers; and
   a transmission power controller configured to reduce maximum transmission power values of some of the plural component carriers when the operation state determinator determines to change the first operating state to the second operating state,
   wherein, in the second operating state, the scheduler is configured to preferentially allocate, to the radio terminal, one of the component carriers that has a transmission power dynamic range whose lower limit value is lower than lower limit values of the transmission power dynamic ranges of a rest of the component carriers.

4. The radio base station as claimed in claim 3, further comprising:
   a controller configured to permit radio communications using carrier aggregation that allocates plural component carriers to a radio terminal in the first operating state and to prevent the radio communications using the carrier aggregation in the second operating state.

5. The radio base station as claimed in claim 1,
   wherein as the process of preferentially allocating, to the radio terminal, one of the component carriers that has the transmission power dynamic range whose lower limit value is lower than lower limit values of the transmission power dynamic ranges of the rest of the component carriers, the scheduler is configured to preferentially allocate, to the radio terminal, one of the component carriers that has a maximum transmission power value that is lower than maximum transmission power values of a rest of the component carriers.

6. The radio base station as claimed in claim 3, further comprising:
   an interface configured to receive a control signal from an upper node,
   wherein the operation state determinator is configured to determine whether to set the radio base station to the second operating state by referring to at least one of the control signal from the upper node, a control signal from another radio base station, and information indicating traffic of another radio base station.

7. The radio base station as claimed in claim 3, wherein the operation state determinator is configured to determine to set the radio base station to one of the first operating state and the second operating state based on at least one of traffic information, power resource information, power supply condition information, and external power supply information.

8. The radio base station as claimed in claim 3, further comprising:
an interface configured to communicate with another radio base station,
wherein the operation state determinator is configured to determine whether to set the other radio base station to the first operating state or the second operating state, and
wherein, the interface is configured to report a result determined by the operation state determinator to the other radio base station.

9. The radio base station as claimed in claim 8, wherein the operation state determinator is configured to cause a radio terminal, which is in a component carrier whose lower limit value of the transmission power dynamic range is to be reduce as a result of setting other radio base station to the second operating state, to be handed over to another component carrier.

10. A control method in a radio base station providing a service to a radio terminal by using plural component carriers, comprising:
preferentially allocating, to the radio terminal, one of the component carriers that has a transmission power dynamic range that is defined by an upper limit value and a lower limit value and the lower limit value of which is lower than lower limit values of transmission power dynamic ranges of a rest of the component carriers; and
transmitting a radio signal to the radio terminal by using the allocated component carrier.

11. A radio communication system comprising:
a radio terminal; and
a radio base station providing a service to the radio terminal by using plural component carriers,
wherein the radio terminal is configured to report reception quality of a downlink signal to the radio base station, and
wherein the radio base station includes:
a scheduler configured to preferentially allocate, to the radio terminal, one of the component carriers that has a transmission power dynamic range that is defined by an upper limit value and a lower limit value and the lower limit value of which is lower than lower limit values of transmission power dynamic ranges of a rest of the component carriers; and
a transmitter configured to transmit a radio signal to the radio terminal by using the allocated component carrier.

* * * * *